United States Patent
Yamashita et al.

(10) Patent No.: US 7,468,854 B2
(45) Date of Patent: Dec. 23, 2008

(54) STORAGE APPARATUS, CONTROL METHOD, CONTROL DEVICE, AND PROGRAM WHICH CAN CONTROL FLYING HEIGHT OF HEAD ACCURATE

(75) Inventors: Satoshi Yamashita, Kawasaki (JP); Syunji Saitou, Kawasaki (JP); Yukio Abe, Kawasaki (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/645,189

(22) Filed: Dec. 22, 2006

(65) Prior Publication Data
US 2008/0043363 A1   Feb. 21, 2008

(30) Foreign Application Priority Data
Aug. 18, 2006   (JP) .............................. 2006-222967

(51) Int. Cl.
G11B 21/02 (2006.01)
G11B 5/00 (2006.01)
(52) U.S. Cl. .......................................... 360/75; 360/31
(58) Field of Classification Search ....................... None
See application file for complete search history.

(56) References Cited

U.S. PATENT DOCUMENTS

| 4,777,544 | A | 10/1988 | Brown et al. | |
| 7,079,337 | B2 * | 7/2006 | Tokizono et al. | 360/31 |
| 7,286,315 | B2 * | 10/2007 | Ryu | 360/75 |
| 2005/0046985 | A1 | 3/2005 | Morinaga et al. | |
| 2005/0213250 | A1 | 9/2005 | Kurita et al. | |
| 2007/0268605 | A1 * | 11/2007 | Ryu | 360/31 |

FOREIGN PATENT DOCUMENTS

| JP | 11045436 A | * 2/1999 |
| JP | 2002-037480 | 5/2002 |
| JP | 2005-071546 | 3/2005 |
| JP | 2005-276284 | 10/2005 |
| WO | WO 02/37480 | 5/2002 |

* cited by examiner

Primary Examiner—Jason C Olson
(74) Attorney, Agent, or Firm—Greer, Burns & Crain, Ltd.

(57) ABSTRACT

An amplitude measurement unit measures an amplitude of a read signal from a preamble unit in a servo area of a predetermined frame number m per one rotation of the recording medium for a predetermined cycle number n while increasing an electric power amount distributed to the heater in the state in which the head is positioned to a track on the recording medium, and a mean amplitude calculating unit calculates a mean amplitude from an amplitude measurement value which is measured by the number which is the frame number m multiplied by the cycle number n. A contact determination unit calculates a mean amplitude variation amount per a unit heater electric power amount as a contact determination value, and determines that the head is in contact with the recording medium when the contact determination value is lower than a predetermined threshold value, and a flying height calculating unit which calculates a flying height of the head with respect to the surface of the recording medium from the heater electric power amount at the point when contact is determined.

17 Claims, 30 Drawing Sheets

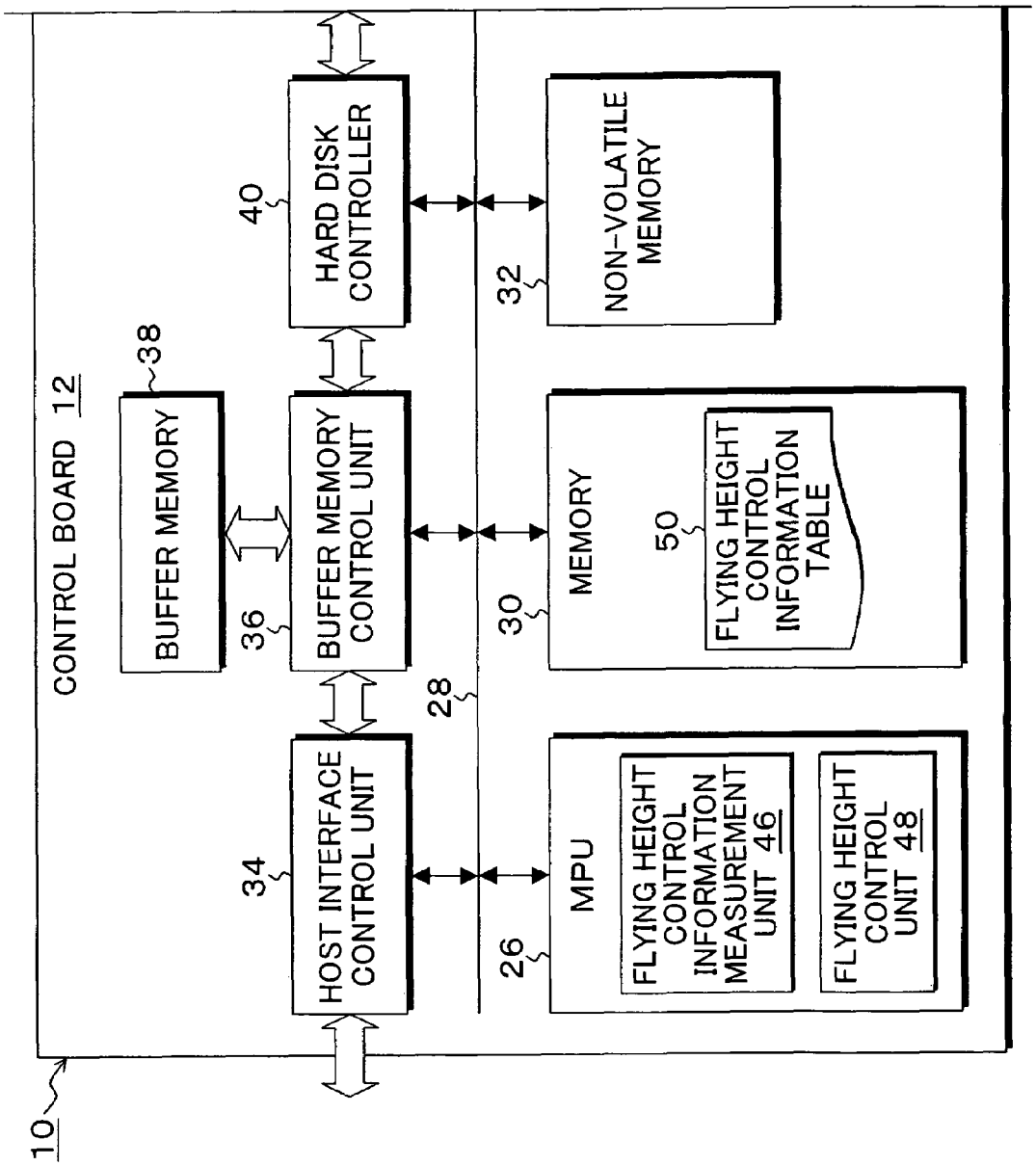

FIG. 5

| ZONE No. 92 | FLYING HEIGHT [nm] 94 | TARGET FLYING HEIGHT [nm] 96 | HEATER PROTRUSION SENSITIVITY [nm/w] 98 | PROTRUSION TRANSITION TIME [sec] 100 | RECORDING CURRENT PROTRUSION DISTANCE [nm] 102 | PROTRUSION SENSITIVITY TEMPERATURE CORRECTION COEFFICIENT 104 | FLYING HEIGHT TEMPERATURE CORRECTION COEFFICIENT 106 |
|---|---|---|---|---|---|---|---|
| Z1 | do1 | dp | e1 | tp1 | dw1 | Ke1 | Kd1 |
| Z2 | do2 | dp | e2 | tp2 | dw2 | Ke2 | Kd2 |
| Z3 | do3 | dp | e3 | tp3 | dw3 | Ke3 | Kd3 |
| Z4 | do4 | dp | e4 | tp4 | dw4 | Ke4 | Kd4 |
| Z5 | do5 | dp | e5 | tp5 | dw5 | Ke5 | Kd5 |
| Z6 | do6 | dp | e6 | tp6 | dw6 | Ke6 | Kd6 |
| Z7 | do7 | dp | e7 | tp7 | dw7 | Ke7 | Kd7 |
| Z8 | do8 | dp | e8 | tp8 | dw8 | Ke8 | Kd8 |
| Z9 | do9 | dp | e9 | tp9 | dw9 | Ke9 | Kd9 |
| Z10 | do10 | dp | e10 | tp10 | dw10 | Ke10 | Kd10 |

50

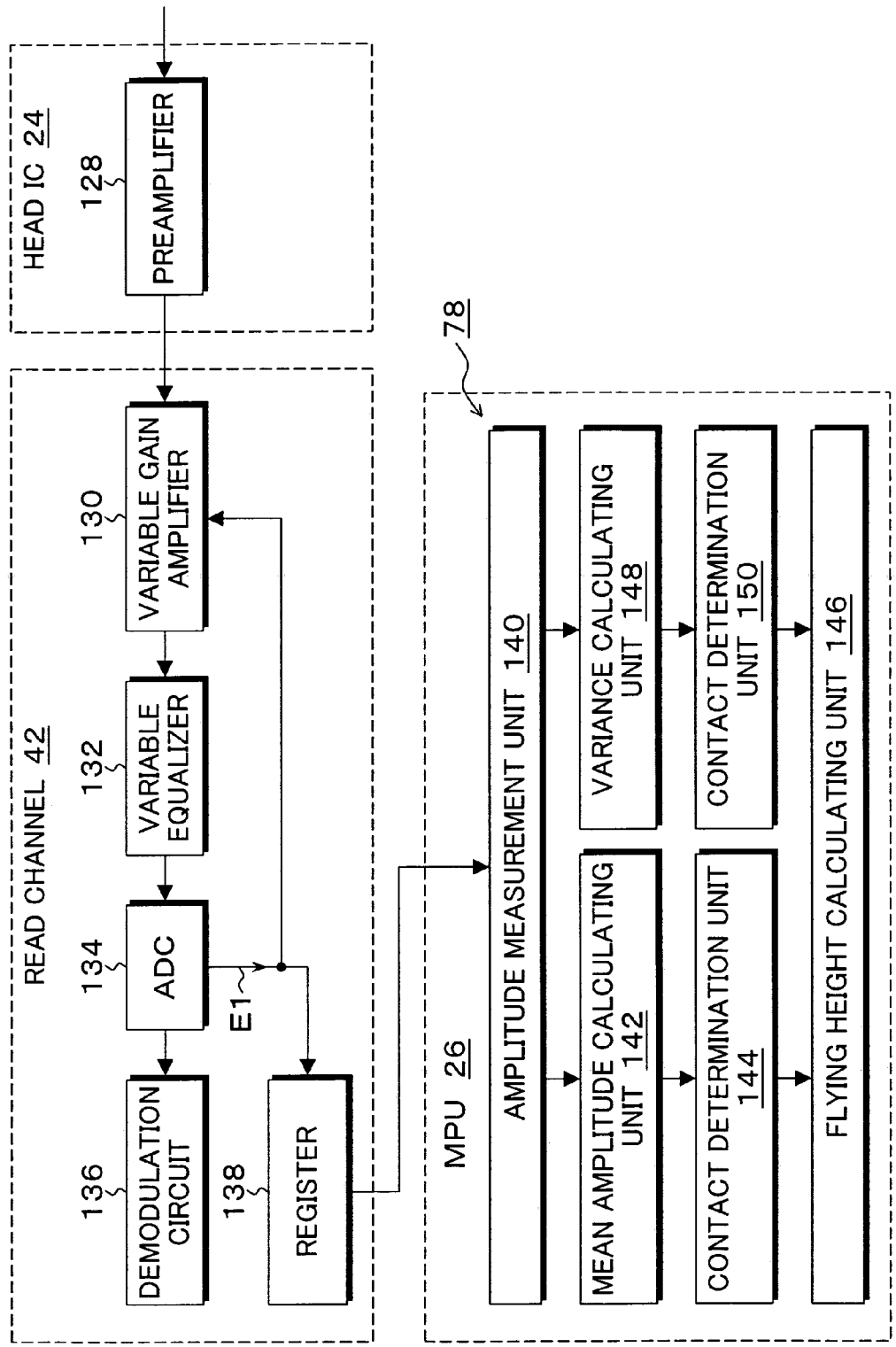

INNER WAVEFORM

OUTER WAVEFORM

STORAGE APPARATUS, CONTROL METHOD, CONTROL DEVICE, AND PROGRAM WHICH CAN CONTROL FLYING HEIGHT OF HEAD ACCURATE

This application is a priority based on prior application No. 2006-222967, filed Aug. 18, 2006, in Japan.

BACKGROUND OF THE INVENTION

1. Field of the Invention

The present invention relates to a storage apparatus, a control method, a control device, and a program for reading/writing data by flying a head above a rotating recording medium, and particularly relates to a storage apparatus, a control method, a control device, and a program for controlling a flying height between a head and a recording medium to a predetermined target flying height by changing a protrusion value by thermal expansion which accompanies electric power distribution to and heating of a heater provided in the head.

2. Description of the Related Arts

Conventionally, the flying height of the head with respect to the recording surface of a magnetic disk has to be reduced in order to realize a high recording density of a magnetic disk apparatus, and a flying height of 10 nm order is realized recently. However, when the flying height of the head is reduced, collision with minute protrusions on the magnetic disk surface is readily generated, and variation of the clearances between heads is present in the range of mechanical common differences; therefore, there is a problem that the flying height cannot be set lower than the range of common differences when the medium contact is taken into consideration. Therefore, recently, like JP2002-037480, there is proposed a method in which variation in the protrusion value (TPR value) caused by a phenomenon in which the head flying surface protrudes toward the direction of the magnetic disk due to temperature increase in a write head (thermal protrusion: TPR) is measured in an examination process or the like and retained in a magnetic disk, and the data is used for controlling flying heights for each head. Furthermore, there have also been proposed methods like JP2005-071546 and JP2005-276284 in which a heater is incorporated in a head, and the clearance between the head and the recording surface of a magnetic disk is controlled by utilizing the protrusion phenomenon caused by thermal expansion of the head flying surface accompanying electric power distribution to the heater. In JP2005-071546, a constant element temperature is maintained by changing the electric power applied to an electricity conduction film provided on the head with respect to increase in the apparatus temperature or the element temperature which is caused by recording/reproduction, thereby maintaining a constant clearance between the element and the recording medium. In JP2005-276284, a flying-height-increasing heating device which increases the distance between the recording/reproduction element and the magnetic disk surface by causing a part of an air bearing surface of the head to expand and protrude by heating, and a flying-height-reducing heating device which reduces the distance between the recording/reproduction element and the magnetic disk surface by causing another part of the head air bearing surface to expand and protrude by heating are provided in the head, and the flying height is corrected such that reproduction can be performed without causing collision during, for example, activation of the apparatus. Moreover, as the method for measuring the changed distance of the flying height between the head of the magnetic disk apparatus and the magnetic disk, a method utilizing the fact that reproduction amplitude lead from Wallace (Wallace) spacing loss is changed in accordance with the flying height is known (U.S. Pat. No. 4,777,544).

However, in such conventional methods of controlling the flying height between the head and the magnetic disk recording surface, basically, the protrusion value is adjusted so that reproduction can be performed without causing medium contact by utilizing the fact that flying height is changed due to expansion/protrusion of the head flying surface when the heater is heated by distributing electric power; and there has been a problem that highly precise flying height control of controlling the flying height upon recording and reproduction to a constant target flying height by taking variation of the flying heights which are different in each head into consideration cannot be performed. Moreover, in the conventional flying height measurement utilizing Wallace spacing loss (Wallace), the flying height is measured from amplitude change in a reproduction signal when the head is caused to fly by activating the magnetic disk apparatus in the state in which the head is in contact with and stopped in a contact-start-stop area of the magnetic disk surface. However, in recent magnetic disk apparatuses, contact-start-stop of the head is abolished, and a head retained in a ramp load mechanism is delivered to the disk surface upon activation of the apparatus in the state in which the magnetic disk is rotating, thereby causing it to fly from the beginning; thus, there is a problem that the amplitude change while the head which is in contact with the magnetic disk surface is flying cannot be detected, and the flying height cannot be measured from unchanged amplitude of the reproduction signal of the head which is flying with a constant flying height.

SUMMARY OF THE INVENTION

According to the present invention to provide a storage apparatus, a control method, and a program which can perform highly accurate control so that the flying height of a head with respect to a medium recording surface can be accurately measured by controlling the electric power amount distributed to a heater provided in the head.

(Apparatus)

The present invention provides a storage apparatus. The storage apparatus of the present invention is characterized by having a head which has at least a reading element, is provided with a heater which varies a protrusion value by thermal expansion which accompanies electric power distribution and heating, and accesses data by flying above a rotating recording medium;

an amplitude measurement unit which measures an amplitude of a read signal from a preamble unit in a servo area of a predetermined frame number m per one rotation of the recording medium by the reading element for a predetermined cycle number n while increasing an electric power amount distributed to the heater in the state in which the head is positioned to a track on the recording medium;

a mean amplitude calculating unit which calculates a mean amplitude for each of the heater electric power amount from an amplitude measurement value which is measured by the amplitude measurement unit and measured by a number which is the predetermined frame number m multiplied by the predetermined cycle number n;

a contact determination unit which calculates a contact determination value based on a variation amount in the heater electric power amount and a variation amount in the mean amplitude, and determines that the head is in contact with the recording medium when the contact determination value is lower than a predetermined threshold value; and a flying height calculating unit which calculates a flying height of the head with respect to a surface of the recording medium from the heater electric power amount at the point when contact is determined by the contact determination unit.

Herein, when the mean amplitude of a current time is μ(i), the mean amplitude of a previous time when is μ(i−1), the heater electric power of the current time is P(i), and the heater electric power of the previous time is P(i−1), the contact determination unit calculates the contact determination value as a contact determination value S1(i) which is a ratio of a variation amount Δμ(i) of the mean amplitudes with respect to a variation amount ΔP(i) of the heater electric power amounts of the previous time and the current time.

When the relation is expressed by an expression wherein the mean amplitude of a present time is μ(i), the mean amplitude of a previous time is μ(i−1), the heater electric power of the present time is P(i), and the heater electric power of the previous time is P(i−1), the contact determination unit calculates a variation ratio S1(i) as the contact determination value by $$S1(i) = \frac{\mu(i) - \mu(i-1)}{P(i) - P(i-1)}.$$

When measurement time points are in a time sequence of a present time point i, a future measurement time point i+α, and a past measurement time point i−α (wherein, α is an integer of 1, 2, 3 . . . ), the contact determination unit obtains a first mean which is a mean amplitude of future w measurement time points from α=0 to α=w−1 including the present time point i and a second mean which is a mean amplitude of measurement time points of past w points from α=1 to α=w, and further calculates a variation ratio S2(i) of the first mean and the second mean as the contact determination value.

When this relation is expressed by an expression wherein measurement time points are in a time sequence of a present time point i, a future measurement time point i+α, and a past measurement time point i−α (wherein, α is an integer of 1, 2, 3 . . . ), the contact determination unit calculates a variation ratio S2(i) as the contact determination value as $$S2(i) = \frac{(1/w)\sum_{\alpha=0}^{w-1}\mu(i+\alpha) - (1/w)\sum_{\alpha=1}^{w}\mu(i-\alpha)}{w}$$

based on a mean amplitude of future w measurement time points including the present time point i and a mean amplitude of past w measurement time points.

The number w used in the calculation of the variation ratio S2(i) as the contact determination value is 2 or 3.

The predetermined frame number m of the amplitude measurement unit is a frame number which is ½ or less the disk medium, and the predetermined cycle number n is 10 to 100.

The predetermined frame number m of the amplitude measurement unit is caused to be large in an inner circumferential side of the disk medium and is caused to be small in an outer circumferential side of the disk medium.

Another mode of the storage apparatus according to the present invention is characterized by having a head which has at least a reading element, is provided with a heater which varies a protrusion value by thermal expansion which accompanies electric power distribution and heating, and accesses data by flying above a rotating recording medium;

an amplitude measurement unit which measures an amplitude of a read signal from a preamble unit in a servo area of a predetermined frame number m per one rotation of the recording medium by the reading element for a predetermined cycle number n while increasing an electric power amount distributed to the heater in the state in which the head is positioned to a track on the recording medium;

a variance calculating unit which calculates a variance for each heater electric power amount from a plurality of amplitude measurement values measured by the amplitude measurement unit;

a contact determination unit which determines that the head is in contact with the recording medium when the variance exceeds a threshold value; and a flying height calculating unit which calculates a flying height of the head with respect to a surface of the recording medium from the heater electric power amount at the point when contact is determined by the contact determination unit.

Herein, when a mean amplitude of each cycle measured at the heater electric power amount P(i) is V(i, j), and a mean amplitude of n cycles is μ(i), the variance calculating unit calculates the variance as $$\sigma^2 = \frac{\sum_{j=1}^{n}\{V(i, j) - \mu(i)\}^2}{n}.$$

The predetermined frame number m of the amplitude measurement unit is 1 or 2, and the predetermined cycle number n is 10 to 100.

The variance calculating unit may calculate a standard deviation σ as a square root of the variance σ2, and the contact determination unit may determine that the head is in contact with the recording medium when the standard deviation exceeds a predetermined threshold value.

(Method)

The present invention provides a control method of the storage apparatus. The present invention is a control method of a storage apparatus having a head which has at least a reading element, is provided with a heater which varies a protrusion value by thermal expansion which accompanies electric power distribution and heating, and accesses data by flying above a rotating recording medium; the control method characterized by including an amplitude measurement step in which an amplitude of a read signal from a preamble step in a servo area of a predetermined frame number m per one rotation of the recording medium is measured by the reading element for a predetermined cycle number n while increasing an electric power amount distributed to the heater in the state in which the head is positioned to a track on the recording medium;

a mean amplitude calculating step in which a mean amplitude is calculated for each of the heater electric power amount from an amplitude measurement value which is measured in the amplitude measurement step and measured by a number which is the predetermined frame number m multiplied by the predetermined cycle number n;

a contact determination step in which a contact determination value is calculated based on a variation amount in the heater electric power amount and a variation amount in the mean amplitude, and it is determined that the head is in contact with the recording medium when the contact determination value is lower than a predetermined threshold value; and a flying height calculating step in which a flying height of the head with respect to a surface of the recording medium is calculated from the heater electric power amount at the point when contact is determined in the contact determination step.

In another mode of the present invention, a control method of a storage apparatus having a head which has at least a reading element, is provided with a heater which varies a protrusion value by thermal expansion which accompanies electric power distribution and heating, and accesses data by flying above a rotating recording medium is characterized by including an amplitude measurement step in which an amplitude of a read signal is measured from a preamble step in a servo area of a predetermined frame number m per one rotation of the recording medium by the reading element for a predetermined cycle number n while increasing an electric power amount distributed to the heater in the state in which the head is positioned to a track on the recording medium;

a variance calculating step in which a variance for each heater electric power amount is calculated from a plurality of amplitude measurement values measured in the amplitude measurement step;

a contact determination step in which it is determined that the head is in contact with the recording medium when the variance exceeds a threshold value; and a flying height calculating step in which a flying height of the head with respect to a surface of the recording medium is calculated from the heater electric power amount at the point when contact is determined in the contact determination step and outputs the flying height.

(Control Device)

The present invention provides a control device of the storage apparatus. The present invention is a control device of a storage apparatus having a head which has at least a reading element, is provided with a heater which varies a protrusion value by thermal expansion which accompanies electric power distribution and heating, and accesses data by flying above a rotating recording medium; the control device characterized by having an amplitude measurement unit which measures an amplitude of a read signal from a preamble unit in a servo area of a predetermined frame number m per one rotation of the recording medium by the reading element for a predetermined cycle number n while increasing an electric power amount distributed to the heater in the state in which the head is positioned to a track on the recording medium;

a mean amplitude calculating unit which calculates a mean amplitude for each of the heater electric power amount from an amplitude measurement value which is measured by the amplitude measurement unit and measured by a number which is the predetermined frame number m multiplied by the predetermined cycle number n;

a contact determination unit which calculates a contact determination value based on a variation amount in the heater electric power amount and a variation amount in the mean amplitude, and determines that the head is in contact with the recording medium when the contact determination value is lower than a predetermined threshold value; and a flying height calculating unit which calculates a flying height of the head with respect to a surface of the recording medium from the heater electric power amount at the point when contact is determined in the contact determination step.

In another mode of the present invention, a control device of a storage apparatus having a head which has at least a reading element, is provided with a heater which varies a protrusion value by thermal expansion which accompanies electric power distribution and heating, and accesses data by flying above a rotating recording medium is characterized by having an amplitude measurement unit which measures an amplitude of a read signal from a preamble unit in a servo area of a predetermined frame number m per one rotation of the recording medium by the reading element for a predetermined cycle number n while increasing an electric power amount distributed to the heater in the state in which the head is positioned to a track on the recording medium;

a variance calculating unit which calculates a variance or a standard deviation for each heater electric power amount from a plurality of amplitude measurement values measured by the amplitude measurement unit;

a contact determination unit which determines that the head is in contact with the recording medium when the variance or the standard deviation exceeds a threshold value; and a flying height calculating unit which calculates a flying height of the head with respect to a surface of the recording medium from the heater electric power amount at the point when contact is determined by the contact determination unit.

(Program)

The present invention provides a program executed by the computer of the storage apparatus. The present invention is characterized by causing a computer of a storage apparatus having a head which has at least a reading element, is provided with a heater which varies a protrusion value by thermal expansion which accompanies electric power distribution and heating, and accesses data by flying above a rotating recording medium to execute an amplitude measurement step in which an amplitude of a read signal is measured from a preamble unit in a servo area of a predetermined frame number m per one rotation of the recording medium by the reading element for a predetermined cycle number n while increasing an electric power amount distributed to the heater in the state in which the head is positioned to a track on the recording medium;

a mean amplitude calculating step in which a mean amplitude is calculated for each of the heater electric power amount from an amplitude measurement value which is measured in the amplitude measurement step and measured by a number which is the predetermined frame number m multiplied by the predetermined cycle number n;

a contact determination step in which a contact determination value is calculated based on a variation amount in the heater electric power amount and a variation amount in the mean amplitude, and it is determined that the head is in contact with the recording medium when the contact determination value is lower than a predetermined threshold value; and a flying height calculating step in which a flying height of the head with respect to a surface of the recording medium is calculated from the heater electric power amount at the point when contact is determined in the contact determination step and outputs the flying height.

Another mode of the present invention is characterized by causing a computer of a storage apparatus having a head which has at least a reading element, is provided with a heater which varies a protrusion value by thermal expansion which accompanies electric power distribution and heating, and accesses data by flying above a rotating recording medium to execute an amplitude measurement step in which an amplitude of a read signal is measured from a preamble step in a servo area of a predetermined frame number m per one rotation of the recording medium by the reading element for a predetermined cycle number n while increasing an electric power amount distributed to the heater in the state in which the head is positioned to a track on the recording medium;

a variance calculating step in which a variance or a standard deviation for each heater electric power amount is calculated from a plurality of amplitude measurement values measured in the amplitude measurement step;

a contact determination step in which it is determined that the head is in contact with the recording medium when the variance or the standard deviation exceeds a threshold value; and a flying height calculating step in which a flying height of the head with respect to a surface of the recording medium is calculated from the heater electric power amount at the point when contact is determined in the contact determination step and outputs the flying height.

According to the present invention, a flying height of a head in a heater electric-power-non-distributed state, to be precise, a clearance between a reading element of the flying head and a recording medium surface is measured upon correction in an examination process or the like. In this measurement of the flying height, the amplitude of a read signal of a preamble unit of a servo area of the recording medium is measured while causing the head to expand and protrude by increasing the amount of electric power distributed to the heater, it is determined that the head protruding part is in contact with the medium when variation of the mean amplitude obtained from the measured amplitude is equal to or less than a threshold value or when a variance or a standard deviation of the measured amplitude is equal to or more than a threshold value, and the flying height is calculated from the heater electric power amount at that point. The inventor of the present application used to gradually increase the electric power amount distributed to the heater and determine the contact between the flying head and the recording medium when a derivative value of the measured amplitude is lower than a threshold value; however, the preamble read signal is largely varied depending on, the head, medium, track position, etc., and there has been a problem that erroneous detection occurs when the variation amount of the measured amplitude caused by increase in the amount of electric power distributed to the heater and measurement variation of the measured amplitude at that time are approximately the same. Therefore, in the present invention, the amplitudes of read signals from preamble units in servo areas of a predetermined frame number m per one rotation of a recording medium are measured by a reading element for a predetermined cycle number n, for example, 10 to 100 cycles while increasing the electric power amount distributed to the heater; from the amplitude measurement values measured by the number which is a predetermined frame number m multiplied by the predetermined cycle number n, a mean amplitude corresponding to the heater distributed electric power amount at that point is calculated; and measurement variation in reproduced amplitudes is reduced by determining contact with the recording medium from a variation ratio of the mean amplitude or a variance; thus, contact with the recording medium can be accurately determined, and the flying height can be accurately measured. Herein, the variance is used as the contact determination value for the reason that, since a phenomenon that the head jumps due to sporadic contact with the medium surface and the amplitude measurement values are largely varied is seen in an initial stage in which contact between the head and the recording medium begins, the increase in the variation can be captured by the variance so as to accurately determine the contact. Since the flying height of the head can be accurately measured in this manner, for example, when flying heights are respectively measured in advance for zones which divide the recording medium in radial directions and saved in a table for each head, flying height control which maintains the flying height of the head at the point when no electric power is distributed to the heater to a predetermined target flying height by protrusion caused by heater electric power distribution can be performed upon a write or a read, uniform recording/reproduction characteristics can be obtained even when a head in which variation in the flying height is caused, and head deterioration due to medium contact can be avoided; as a result, the head yield is improved, and cost can be reduced. The above and other objects, features, and advantages of the present invention will become more apparent from the following detailed description with reference to the drawings.

BRIEF DESCRIPTION OF THE DRAWINGS

FIGS. 1A and 1B are block diagrams of a magnetic dick device showing an embodiment of a storage device according to the present invention;

FIG. 5 is an explanatory diagram of a flying height control information table used in the present embodiment;

FIG. 8 is a block diagram showing a functional configuration of the flying height measurement unit according to the present embodiment together with a circuit unit which detects amplitudes of preamble read signals;

DETAILED DESCRIPTION OF THE PREFERRED EMBODIMENTS

Figure 1B:
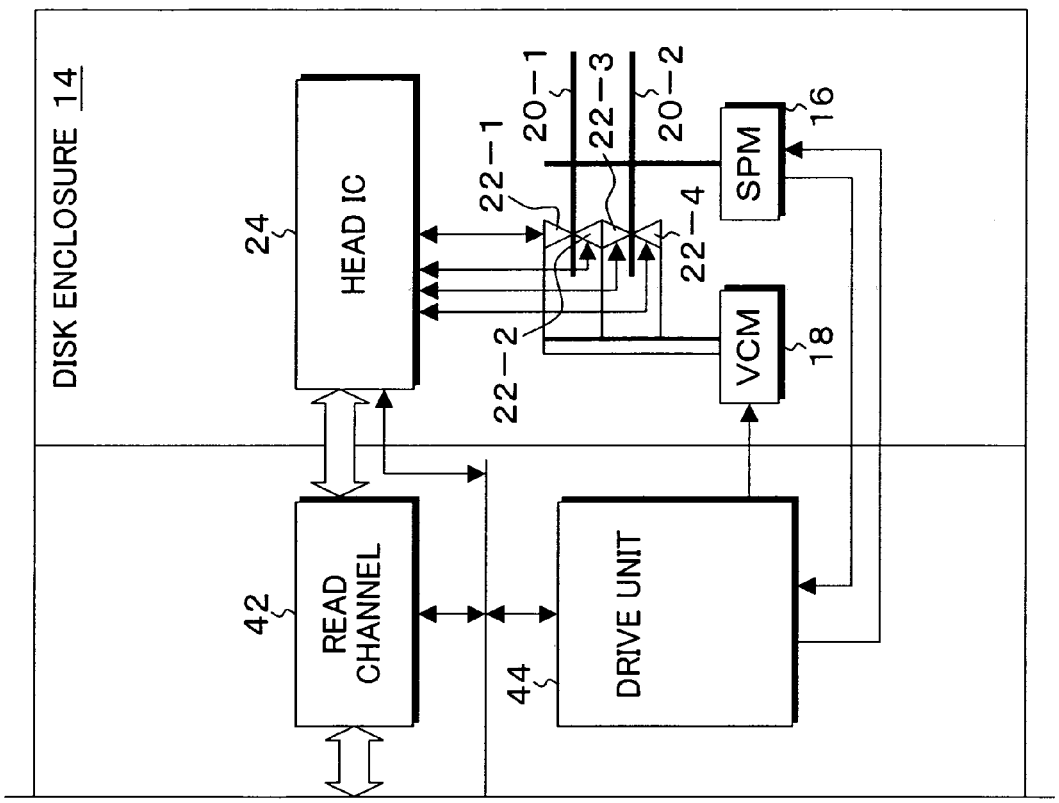

FIGS. 1A and 1B are block diagrams showing an embodiment of a magnetic disk apparatus according to the present invention. In FIGS. 1A and 1B, the magnetic disk apparatus 10 which is known as a hard disk drive (HDD) is comprised of a disk enclosure 14 and a control board 12. A spindle motor (SPM) 16 is provided in the disk enclosure 14; and magnetic disks (storage media) 20-1 and 20-2 are attached to a rotating shaft of the spindle motor 16 and rotated at, for example, 4200 rpm for a certain period of time. In addition, a voice coil motor (VCM) 18 is provided in the disk enclosure 14, wherein the voice coil motor 18 has head actuators having distal ends on which heads 22-1 to 22-4 are loaded so as to perform positioning of the heads with respect to recording surfaces of the magnetic disks 20-1 and 20-2. In addition, recording elements and reading elements are loaded on the heads 22-1 to 22-4 in an integrated manner. The heads 22-1 to 22-4 are connected to a head IC 24 by signal lines, and the head IC 24 selects one of the heads according to a head select signal based on a write command or a read command from a host, which serves as an upper-level apparatus, so as to perform a write or a read. Moreover, in the head IC 24, a write amplifier is provided for a write system, and a pre-amplifier is provided for a read system. An MPU 26 is provided in the control board 12, and, with respect to a bus 28 of the MPU 26, a memory 30 which uses a RAM and stores a control program and control data and a non-volatile memory 32 which uses an FROM or the like and stores a control program are provided. In addition, with respect to the bus 28 of the MPU 26, a host interface control unit 34, a buffer memory control unit 36 which controls a buffer memory 38, a hard disk controller 40, a read channel 42 which functions as a write modulation unit and a read modulation unit, a drive unit 44 which controls the voice coil motor 18 and the spindle motor 16 are provided. The magnetic disk apparatus 10 performs writing processes and reading processes based on commands from the host. Herein, normal operations in the magnetic disk apparatus will be described below. When a write command and write data from the host are received by the host interface control unit 34, the write command is decoded by the MPU 26, and the received write data is stored in the buffer memory 38 in accordance with needs. Then, it is converted into a predetermined data format by the hard disk controller 40, and ECC code is added thereto by ECC processing. Scrambling, RLL code conversion, and write compensation are performed in the write modulation system in the read channel 42. Then, it is written to a magnetic disk 20 from the write amplifier via the head IC 24 and from the recording element of, for example, the selected head 22-1. In this course, the MPU 26 gives a head positioning signal to the drive unit 44 having a VCM motor driver, etc., and, after a target track which is specified by the command is sought, the head is placed on the track by the voice coil motor 18 so as to perform track following control. Meanwhile, when a read command from the host is received by the host interface control unit 34, the read command is decoded by the MPU 26, read signals read by the reading element of the head 22-1 of the head IC 24 which is selected by head selection are amplified by the pre-amplifier. Then, they are input to the read demodulation system of the read channel 42, read data is demodulated by partial response maximum likelihood detection (PRML) or the like, and errors are detected and corrected by performing ECC processing by the hard disk controller 40. Then, they are subjected to buffering to the buffer memory 38, and the read data is transferred to the host from the host interface control unit 34. As functions of the present embodiment realized in the MPU 26 by executing programs, a flying height control information measurement unit 46 and a flying height control unit 48 are provided. The heads 22-1 to 22-4 of the present embodiment have the reading elements and the recording elements and are provided with heaters which change protrusion values by thermal expansion accompanying heating caused by electric power distribution. For example in an examination process in a plant, the flying height control information measurement unit 46 measures flying height information which is required for controlling flying heights between respective reading elements and the recording surfaces of the magnetic disks 20-1 to 20-2 for each of the heads 22-1 to 22-4 at the timing of a self-correction process when the magnetic disk apparatus 10 is activated and records that to system areas of the magnetic disks 20-1, 20-2 or the non-volatile memory 32 of the apparatus. The flying height control information measured by the flying height control information measurement unit 46 includes the following.

(1) Flying height do at a reference temperature (2) Heater protrusion sensitivity e which is a head protrusion value per unit electric power distributed to the heater at the reference temperature (3) Protrusion transition time tp since electric power is distributed to the heater until protrusion deformation of the head is completed (4) Recording current protrusion value dw of the head when a recording current flows through the recording element at the reference temperature (5) Flying height temperature correction coefficient (first temperature correction coefficient) Kd which corrects the flying height do and the recording current protrusion value dw measured at the reference temperature to values at a temperature at the time when the flying height is controlled
(6) Protrusion sensitivity temperature correction coefficient (second temperature correction coefficient) Ke for correcting the heater protrusion sensitivity e measured at the reference temperature to a value at the temperature at the time when the flying height is controlled. The flying height control unit 48 varies the electric power which is distributed to the heater provided in the head to vary the protrusion value of the head, thereby controlling the flying height to a predetermined target flying height upon reproduction and recording. In order to execute the flying height control upon recording or reproduction, when a write command or a read command is received from the host and decoded, a flying height control information table 50 deployed from a system area to the read memory 30 is referenced, and flying height control information corresponding to the target track is obtained.

Figure 2:
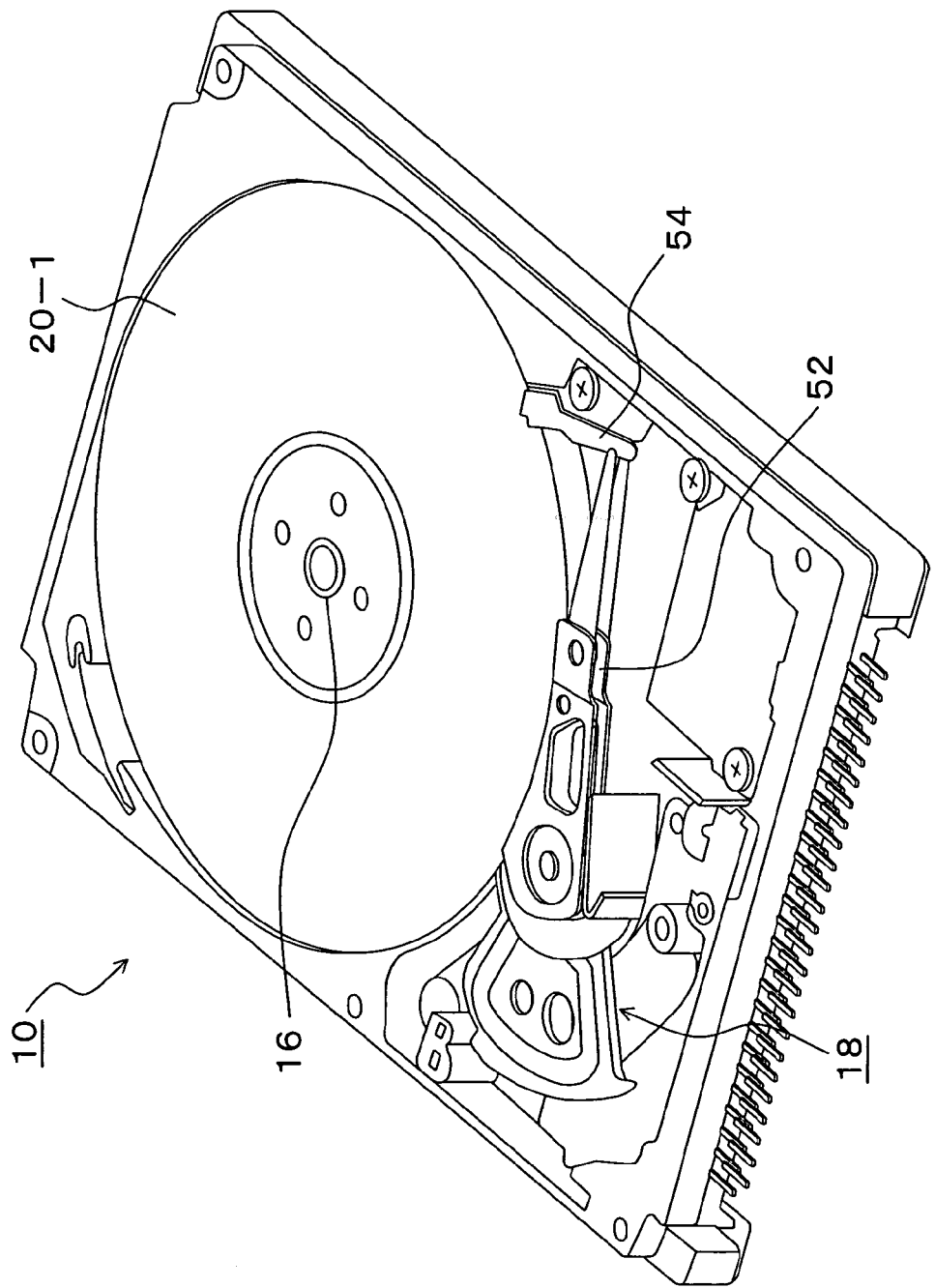
FIG. 2 is an explanatory drawing of a mechanism structure of the magnetic disk device according to the present embodiment.

FIG. 2 shows an inner structure of the disk enclosure 14 in the magnetic disk apparatus 10 of FIGS. 1A and 1B. In FIG. 2, in the magnetic disk apparatus 10, the magnetic disks 20-1 and 20-2 rotated by the spindle motor 16 are incorporated, head actuators 52 which are driven by the voice coil motor 18 with respect to the magnetic disks 20-1 and 20-2 are provided, and the heads are attached to the distal ends of the head actuators 52. The head actuators 52 are at retracted positions in the state shown in the drawing, and, at this point, the head parts at the distal ends of the head actuators 52 are retracted on a ramp mechanism 54 which is disposed toward the head thrown-out direction with respect to the magnetic disks 20-1 and 20-2. When the electric power of the magnetic disk apparatus is turned on, the magnetic disks 20-1 and 20-2 are rotated by the spindle motor 16, and, when the number of rotations reaches a constant number of rotations, the head actuators 52 are turned by the voice coil motor 18 to the side of the magnetic disks 20-1 and 20-2, thereby throwing out the heads from the ramp mechanism 54 onto the magnetic disks 20-1 and 20-1.

Figure 3A:
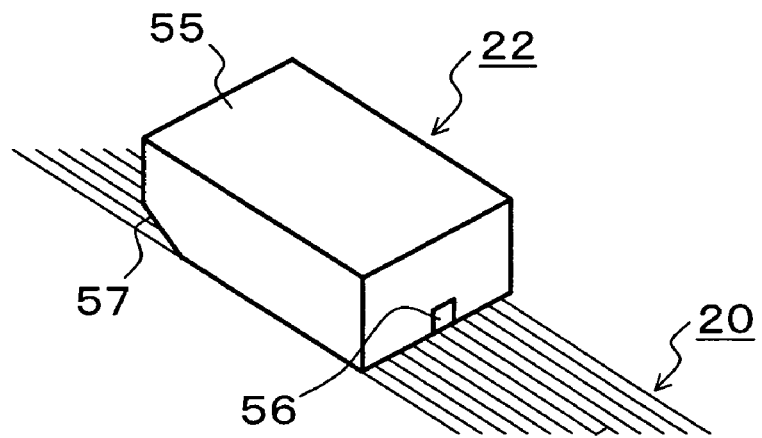
FIGS. 3A and 3B are explanatory drawings of a head structure of the present embodiment.
Figure 3B:
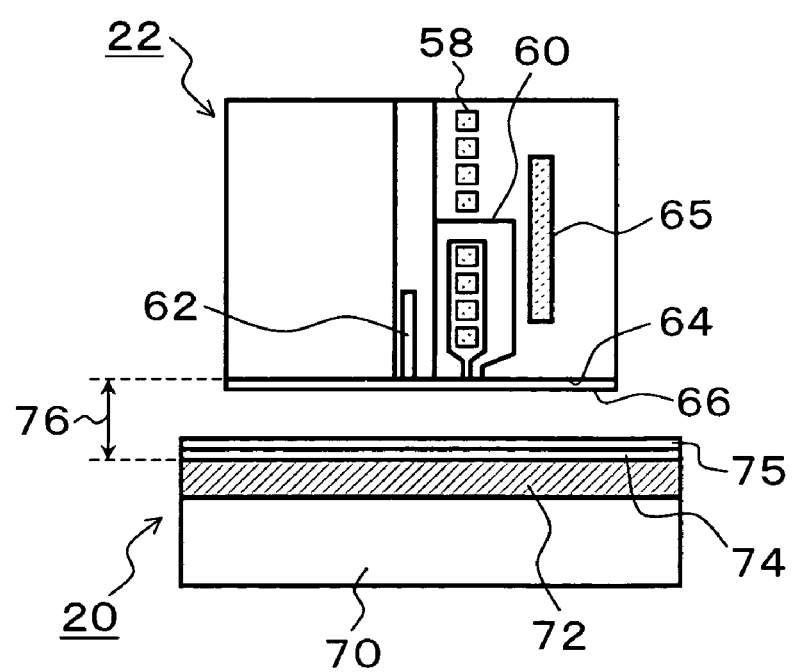

FIGS. 3A and 3B show explanatory drawings of a head structure of the present embodiment. FIG. 3A focuses on a head 22 which is used in the present embodiment, wherein a reading element and a recording element are formed by a film formation technique on an end face of a slider 55 which is made of, for example, a ceramic material such as AlTiC. A tapered surface 57 is formed in the distal end side of the flying surface of the slider 55 which is opposed to the magnetic disk 20, and an air communication groove 56 is formed on the flying surface in the direction of tracks.

FIG. 3B is a cross sectional view wherein the head 22 is viewed in the track direction. A recording coil 58 and a recording core 60 are provided as the recording element in an element part of the head 22 which is made of a ceramic material or the like. A reading element 62 is provided in the left side of the recording element such that it is adjacent thereto. As the reading element 62, a GMR element (Giant Magneto Resistance element) or a TMR element (Tunneling Magneto Resistance element) is used. The surface of the head 22 opposed to the magnetic disk 20 is an ABS surface (Air Bearing-Surface) 64, and a protective film 66 is formed on the surface thereof. On the other hand, in the magnetic disk 20, a recording film 72 is formed on a substrate 70, a protective film 74 is formed subsequent to the recording film 72, and a lubricant 75 is further provided on the surface. In the present embodiment, a heater 65 is provided such that it is close to the recording core 60 which constitutes the recording element of the head 22. When electric power is distributed to the heater 65 so as to carry out heating, the ABS surface 64 serving as the flying surface of the head 22 expands and protrudes toward the side of the magnetic disk 20. A flying height 76 between the head 22 and the magnetic disk 20 is defined as a distance from the lower end of the reading element 62 to the recording film 72 of the magnetic disk 20.

Figure 4:
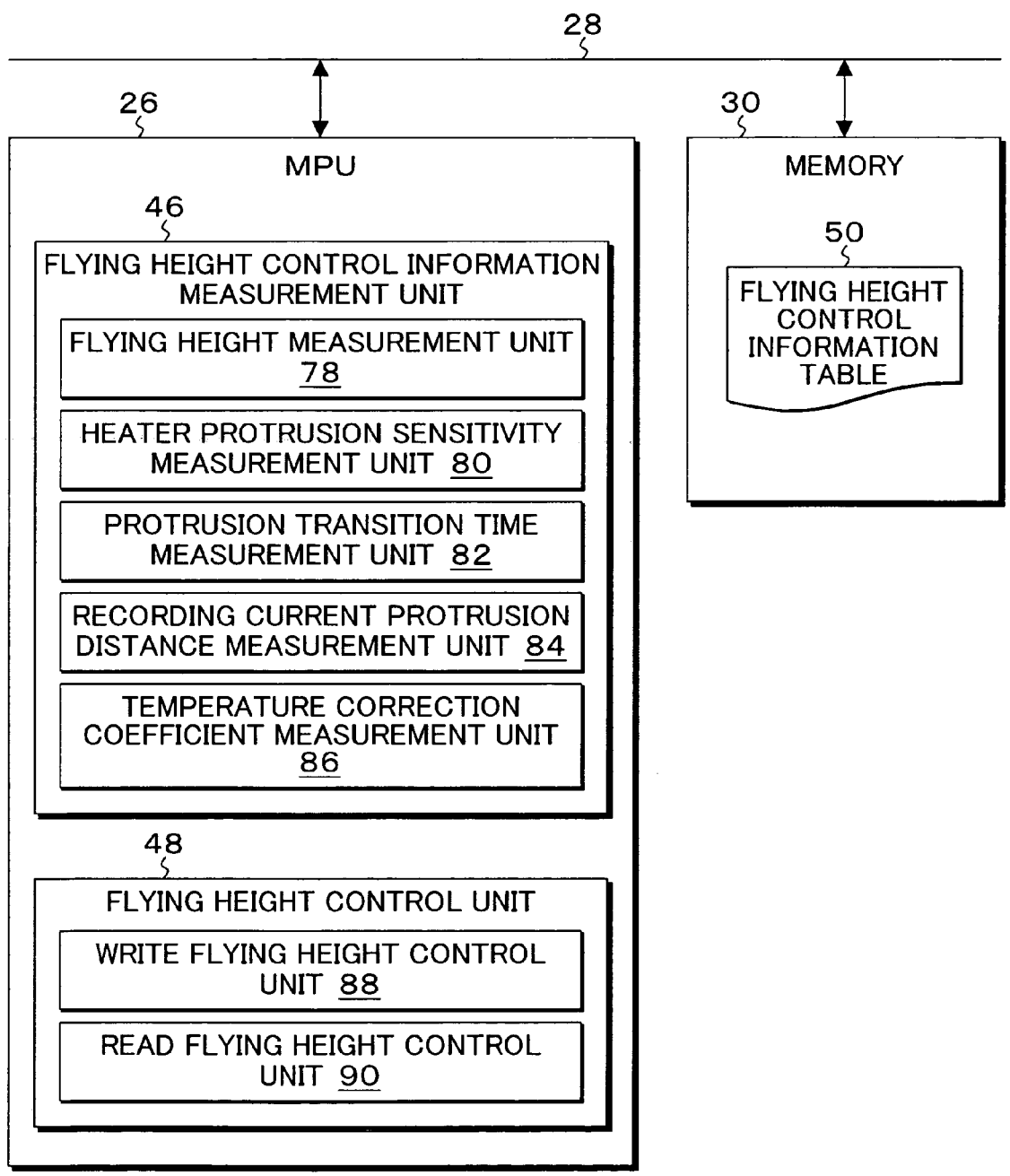
FIG. 4 is a block diagram showing details of a functional configuration of an MPU in the present embodiment.

FIG. 4 is a block diagram showing details of a functional configuration of the MPU 26 in the present embodiment. In FIG. 4, a flying height measurement unit 78, a heater protrusion sensitivity measurement unit 80, a protrusion transition time measurement unit 82, a recording current protrusion value measurement unit 84, and a temperature correction coefficient measurement unit 86 are provided in the flying height control information measurement unit 46 by a firmware program of the MPU 26; and, upon control of the electric power distribution to the heater 65 of the head 22 of FIG. 3B, the control parameters described in above described (1) to (6) which are required for controlling the flying height 76 between the head 22 and the magnetic disk 20 to a predetermined target flying height are measured. In the flying height control unit 48, a write flying height control unit 88 and a read flying height control unit 90 are provided. The write flying height control unit 88 controls the electric power distribution to the heater, which is provided in the head, such that the flying height between the head and the magnetic disk becomes a predetermined write target flying height upon a write to the magnetic disk performed by the recording element of the head. The read flying height control unit 90 controls the electric power distribution to the heater, which is provided in the head, such that the flying height between the head and the magnetic disk becomes a predetermined read target flying height upon a read of the magnetic disk performed by the reading element of the head. Herein, the write target flying height which is a control target of the write flying height control unit 88 and the read target flying height which is a control target of the read flying height control unit 90 may be the same target flying height or different target flying heights respectively for the recording element and the reading element. The control parameters required for control of the flying height control unit 48 are recorded in the system area of the magnetic disk, read out from the system area to the memory 30 upon activation of the magnetic disk apparatus, and deployed as the flying height control information table 50; and, upon recording or reading during operation, the control parameters required for flying height control can be obtained by referencing the control information table 50 of the memory 30.

FIG. 5 is an explanatory diagram of the flying height control information table 50 which is used in the present embodiment. In FIG. 5, the flying height control information table 50 has items of a zone number 92, a flying height 94, a target flying height 96, a heater protrusion sensitivity 98, protrusion transition time 100, a recording current protrusion value 102, a protrusion sensitivity temperature correction coefficient 104, and a flying height temperature correction coefficient 106. In the present embodiment, the magnetic disk is divided into, for example, about 10 to 20 zones in the radial direction, and the flying height control information is measured and managed for each of the zones. In the example of FIG. 5, the magnetic disk is divided into 10 zones Z1 to Z10 and indicated by the number 92 so as to carry out measurement management. The flying height 94 stores flying heights do1 to do10 which are measured upon positioning of the head with respect to particular measurement objective tracks in the zones Z1 to Z10. The target flying height 96 stores, in this example, a read target flying height dp which is common to all the zones. The heater protrusion sensitivity 98 is a head protrusion value per unit distributed electric power of the heater and measured in advance from the measurement result of the protrusion value, which is caused by power distribution to the heater of the head, by using precise measurement equipment which measures micron-order displacement. In this example, same heater protrusion sensitivities e1 to e10 are stored respectively for the zones Z1 to Z10; however, they are basically the same value. The protrusion transition time 100 is the time since electric power is distributed to the heater until heater protrusion is completed, and protrusion transition time tp1 to tp10 is stored respectively for the zones Z1 to Z10. The recording current protrusion value 102 is a head protrusion value when a writing current is caused to flow through the recording element, and recording current protrusion values dw1 to dw10 are stored respectively for the zones Z1 to Z10. Regarding the protrusion sensitivity temperature correction coefficient 104, the flying height 94, the heater protrusion sensitivity 98, and the recording current protrusion value 102 are the values which are measured at a reference temperature, for example, a room temperature of 20° C. in an examination process in a plant, and the apparatus temperature upon recording or reproduction during actual operation of the magnetic disk apparatus is different from the reference temperature; thus, correction based on the difference in the temperatures between the apparatus temperature and the reference temperature is required. In this example, as the protrusion sensitivity temperature correction coefficient 104, temperature correction coefficients Ke1 to Ke10 are stored respectively for the zones Z1 to Z10. Regarding the flying height temperature correction coefficients 106, since the target flying height 96 and the recording current protrusion value 102 are values measured at a reference temperature, for example, a room temperature of 20° C. in a plant examination process which is different from the apparatus temperature during operation, temperature correction therefor is performed; therefore, temperature correction coefficients Kd1 to Kd10 are stored respectively for the zones Z1 to Z10. In the control information table 50 of FIG. 5, the unique flying heights do1 to do10 measured respectively for the zones Z1 to Z10 have to be stored for the flying height 94; however, the heater protrusion sensitivity 98, the protrusion transition time 100, the recording current protrusion value 102, the protrusion sensitivity temperature correction coefficient 104, and the flying height temperature correction coefficient 106 are not required to be obtained respectively for the zones Z1 to Z10 but may be values in a magnetic disk unit which are common to the zones Z1 to Z10.

Figure 6:
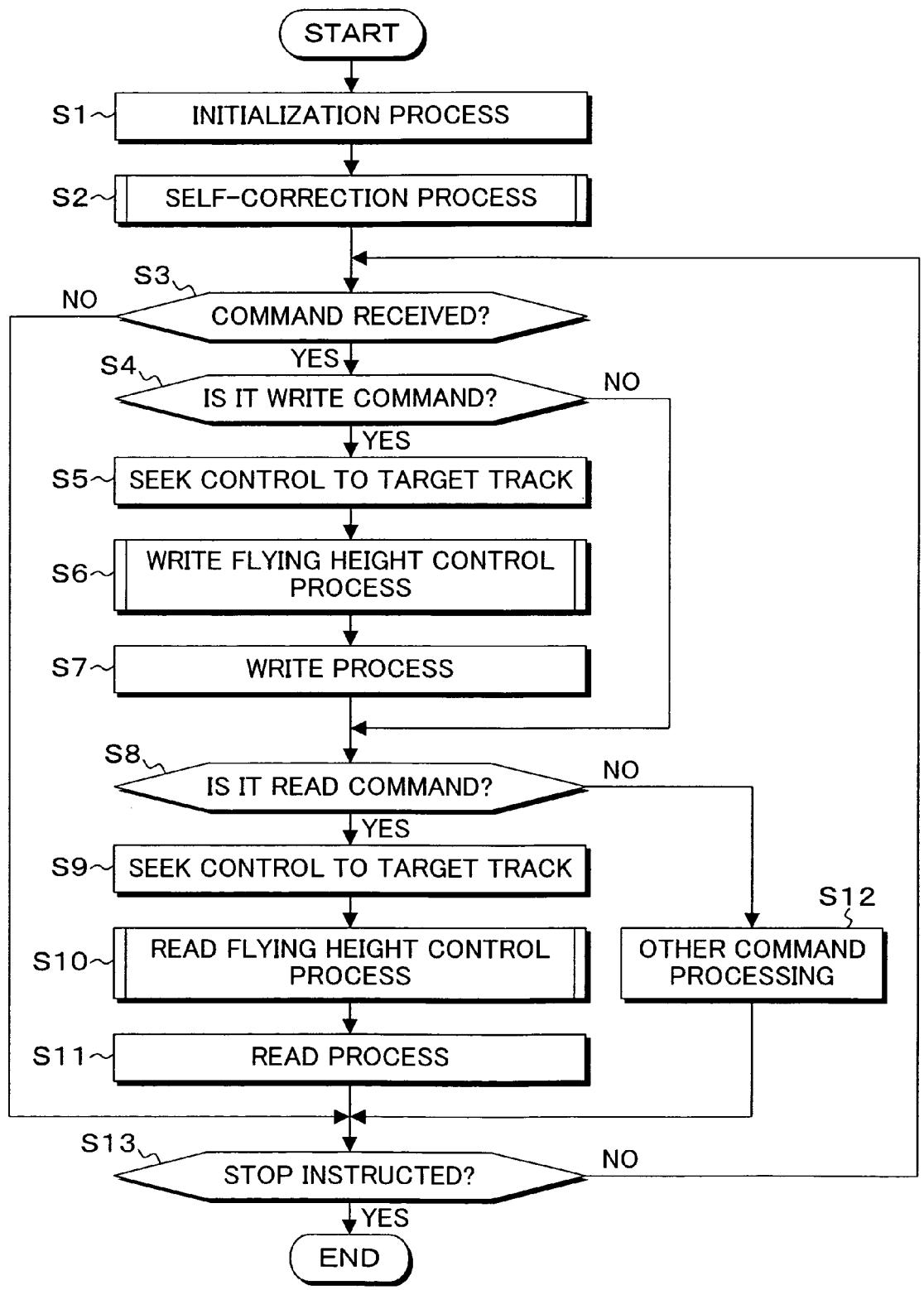
FIG. 6 is a flow chart of an overall processing operation of the present embodiment.

FIG. 6 is a flow chart of an overall processing operation in the magnetic disk apparatus of the present embodiment. In FIG. 6, when the electric power of the magnetic disk apparatus is turned on, an initialization process is performed in step S1, and a self-correction process is executed in step S2. The measurement process of the flying height control information is executed as one processing item of the self-correction process. Herein, the measurement process of the flying height control information is performed in an environmental state in which the apparatus temperature in the examination process of the plant is the reference temperature; therefore, the program which executes the measurement program of the flying height control information, that is, firmware is downloaded to the magnetic disk apparatus merely as firmware of the examination process. When the measurement process is finished, the firmware is deleted from the magnetic disk apparatus, so that the flying height control information measurement process is not performed in a user operation state after shipment from the plant. As a matter of course, the firmware of the flying height control information measurement process may be left in the magnetic disk apparatus, so that the flying height control information measurement process is executed in accordance with needs during user operation. Next, command reception from the host is checked in step S3, and, when a command is received, the process proceeds to step S4 in which whether it is a write command or not is determined. If it is a write command, seek control to a target track based on command decoding is performed in step S5. Subsequently, in step S6, a write flying height control process is executed in an on-track state in which the head is positioned to the target track, and a write process is executed in step S7 in a state in which the flying height of the recording element with respect to the magnetic disk is controlled to a target flying height. If it is not a write command in step S4, whether it is a read command or not is determined in step S8; and, if it is a read command, after seek control to a target control according to command decoding is performed in step S9, a read flying height control process of step S10 is executed in the state in which the head is positioned to the target track. A read process of step S11 is executed in the state in which the reading element is controlled to a target clearance by the read clearance control process. If it is not a read command in step S8, another command processing is executed in step S12. Such processes of steps S3 to S12 are repeated until there is a stop instruction of the apparatus in S13.

Figure 7:
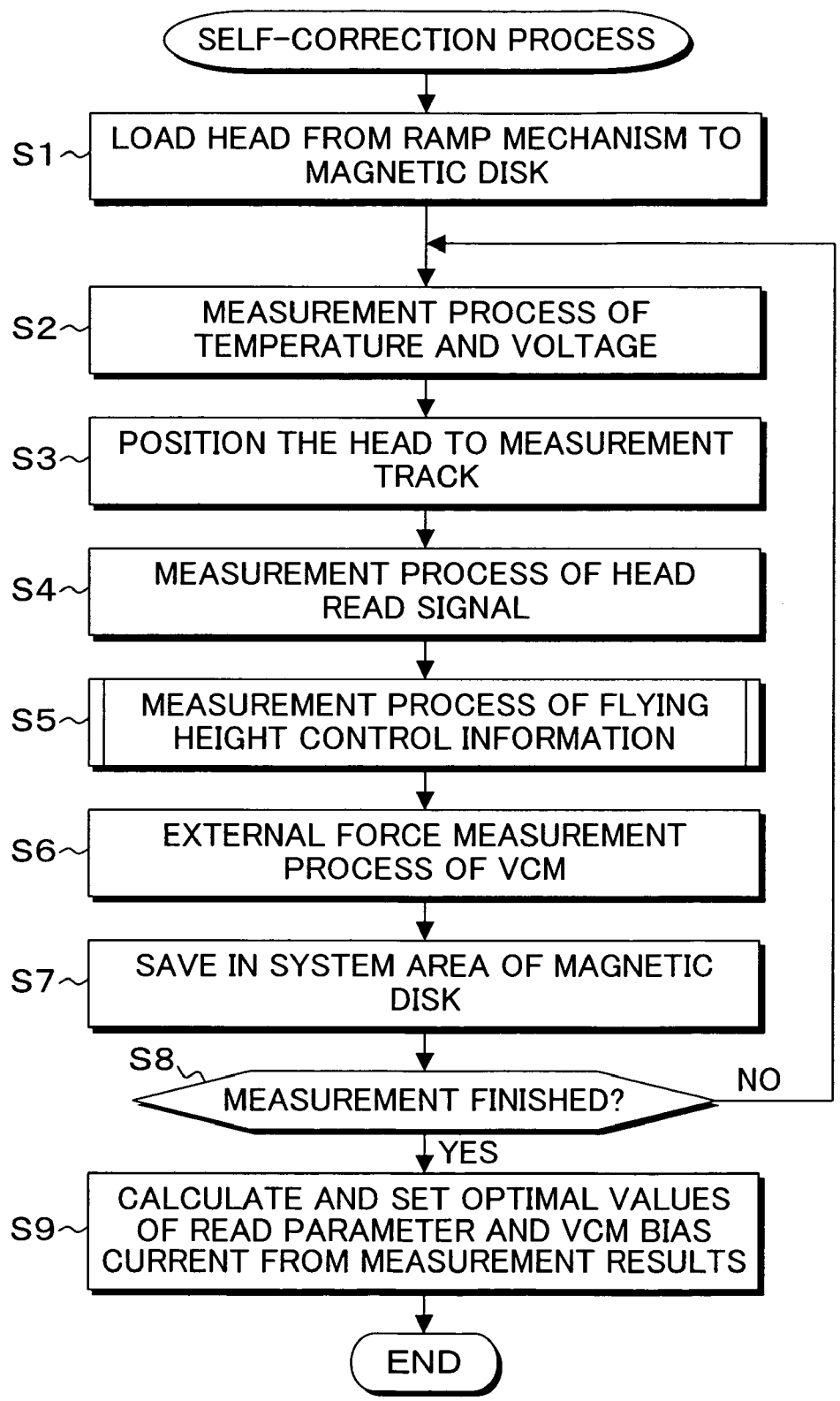
FIG. 7 is a flow chart showing details of the self correction process of step S2 of FIG. 6.

FIG. 7 is a flow chart showing details of the self correction process of step S2 of FIG. 6. In FIG. 7, in the self-correction process, as shown in FIG. 2, the head is loaded from the ramp mechanism 54 to the side of the magnetic disks 20-1 and 20-2 in step S1; and, subsequently in step S2, a measurement process of the temperature and voltage is performed. After the head is positioned to a predetermined measurement track in step S3, a measurement process of a head read signal is performed in step S4. Subsequently, a measurement process of flying height control information is executed in step S5. This measurement process of the flying height control information is performed for each zone of the magnetic disk. Then, in step S6, an external force measurement process of the voice coil motor (VCM) 18 is performed. In the external force measurement process, a VCM bias current at each track position is measured while the head is moved from the inside to the outside by the VCM. Subsequently, in step S7, the measurement results obtained through the processes of steps S2 to S6 are saved in the system area of the magnetic disk. Subsequently, in step S8, whether measurement is finished or not is checked; and, if it is not finished, the processes from step S2 are repeated. If the measurement is finished, in step S9, optimal values of read parameters and the VCM bias currents are calculated from the measurement results and set in a control table.

FIG. 8 is a block diagram showing a circuit configuration of the flying height measurement unit 78 according to the present embodiment, together with a circuit unit which detects the amplitudes of preamble read signals. In FIG. 8, the flying height measurement unit 78 is provided in the MPU 26 as shown in FIG. 4. In the flying height measurement unit 78, an amplitude measurement unit 140, a mean amplitude calculating unit 142, a contact determination unit 144, and a flying height calculating unit 146 are provided; and these units performs flying height measurement processes as the first embodiment and a second embodiment which will be elucidated in later description. Furthermore, in the flying height measurement unit 78, a variance calculating unit 148 and a contact determination unit 150 are provided; when these are combined with the amplitude measurement unit 140 and the flying height calculating unit 146, a processing function corresponding to a third embodiment of a flying height measurement process which will be elucidated in later description is provided. In the state in which the head is positioned to an arbitrary measurement track which is determined for each of the zones on the magnetic disk, the amplitude measurement unit 140 measures the amplitude of read signal from preamble units of servo areas, which are disposed at a constant interval on the track, while increasing a heater electric power amount P distributed to the heater provided in the head. In the amplitude measurement of the preamble read signal at the measurement track, the heater electric power amount is increased by a predetermined amount ΔP, which is determined in advance, from a predetermined initial value or zero; and in the measurement track in the state in which arbitrary electric power P(i) is distributed to the heater, the amplitude of the preamble read signal of servo areas of a predetermined frame number m per one rotation is measured according to an index of the magnetic disk. Herein, the frame number m per one rotation is a number within the frame number of, for example, ½ cycle. For example, since the number of servo frames per one rotation of a magnetic disk is 174 frames, the frame number m per one rotation for performing amplitude measurement of preamble read signals is, for example, m=87 or less. Furthermore, amplitude measurement of the preamble read signals of the frame number m per one rotation is performed for a predetermined cycle number n. The cycle number n in the measurement track in this one measurement is, for example, n=10 to 100. Therefore, the measurement number of the amplitude of the preamble read signal which is measured when the flying height is varied by heating the heater by switching electric power P(i) is (frame number m per one rotation)×(cycle number n). On the other hand, in the third embodiment which will be elucidated in later description and comprises the amplitude measurement unit 140, the variance calculating unit 148, the contact measurement unit 150, and the flying height calculating unit 146, a very small number of frames, one frame or two frames are used as the frame number m per one rotation.

Figure 9A:
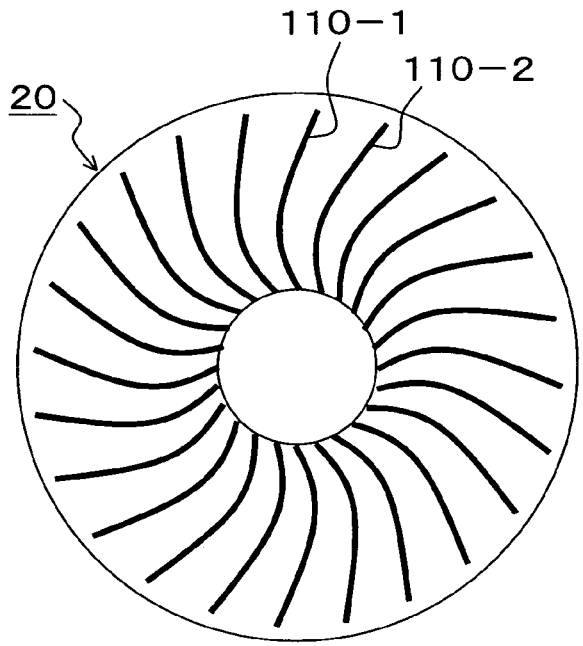
FIGS. 9A and 9B are explanatory diagrams of servo frames and measurement objective track of the magnetic disk.

FIG. 9A focuses on the magnetic disk 20 which is used in the present embodiment. On a storage surface of the magnetic disk 20, servo areas 110-1, 110-2 . . . are stored in advance at constant angle intervals, and the areas therebetween are data areas.

Figure 9B:
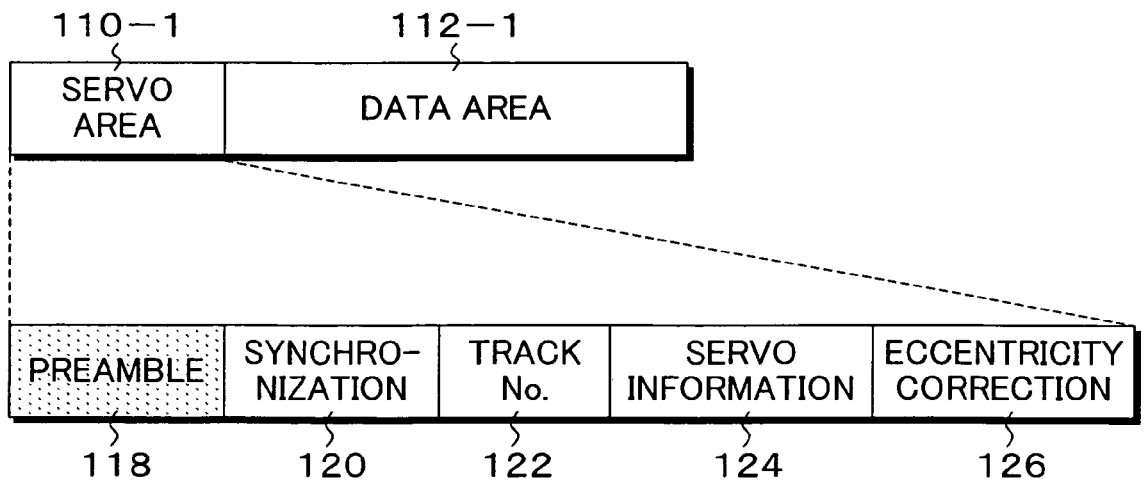

FIG. 9B focuses on one frame of a measurement track in the magnetic disk 20, wherein the frame is shown as a line in order to simplify explanation. The frame comprises the servo area 110-1 and a data area 112-1. The servo area 110-1 comprises, as shown in the lower side in an enlarged manner, a preamble area 118, a synchronization area 120, a track number area 122, a servo information area 124, and an eccentricity correction area 126. Among these, in the preamble area 118, a repetitive pattern of a predetermined frequency which is lower than a basic frequency of user data is stored, and the amplitude thereof is measured by reading the preamble pattern in the present embodiment. Note that, in a particular one area among the plurality of servo areas in FIGS. 9A and 9B, an index area is provided in the servo area 110-1, and a rotation reference value can be detected by reading an index signal of the index area. Amplitude measurement of the preamble read signal is performed by using the circuit unit of FIG. 8. The circuit unit of FIG. 8 focuses on the read channel 42 and the head IC 24 in the magnetic disk apparatus 10 of FIGS. 1A and 1B. In the head IC 24, a preamplifier 128 which amplifies a read signal obtained by a reading device. An output signal from the preamplifier 128 is amplified by a variable gain amplifier VGA 130 of the read channel 42, then equalized by a variable equalizer 132, and subjected to sampling by an AD converter 134 so as to be converted into digital data; and demodulation of the data and servo information is performed in a demodulation circuit 136. Herein, an AGC control signal (automatic gain control signal) E1 which maintains a constant amplifier output amplitude is supplied from the AD converter 134 to the variable gain amplifier 130. In the present embodiment, the AGC signal E1 for the variable gain amplifier 130 is retained in a register 138; and, based on this, the MPU 26 acquires the amplitude of a head read signal, i.e., the amplitude of a preamble read signal obtained as a head read signal as an amplitude measurement value from the AGC signal of the register 138. The mean amplitude calculating unit 142 of FIG. 8 calculates a mean amplitude μ(i) from the amplitude measurement value of the number of the frame number m multiplied by the cycle number n measured by the amplitude measurement unit 140. Herein, the mean amplitude μ(i) means a mean amplitude calculated when the heater is heated by distributing the heater electric power amount P(i). The mean calculation in the mean amplitude calculating unit 142 will be described below in further detail. When a measured amplitude of a preamble read signal of a kth frame continuous in the circumferential direction of a jth measurement track at the heater electric power distribution amount P(i) is V(i, j, k), and a read amplitude of the jth cycle is V(i, k), they are respectively calculated by the following expressions.

$$V(i, j) = \frac{1}{m}\sum_{k=1}^{m} V(i, i, k) \tag{1}$$

$$\mu(i) = \frac{1}{n}\sum_{j=1}^{n} V(i, j) \tag{2}$$

$$= \frac{1}{n}\sum_{j=1}^{n}\left\{\frac{1}{m}\sum_{k=1}^{m} V(i, j, k)\right\}$$

The measured amplitude V(i, j) calculated by the expression (1) is a value of a summation, which is obtained by adding measured amplitudes of the number corresponding to the frame number m calculated in one rotation of a measurement track, divided by the frame number m; thus, the mean amplitude per one rotation of the measurement track is calculated. The expression (2) calculates the mean amplitude μ(i) as a mean value of n cycles with respect to the mean amplitude per one rotation calculated by the expression (1). Next, the contact determination unit 144 of FIG. 8 calculates a contact determination value based on the amount of change if the heater electric power and the amount of change in the mean amplitude, and determines that the head is in contact with the disk medium when the contact determination value is lower than a predetermined threshold value. Furthermore, the flying height calculating unit 146 calculates and outputs the flying height between the head and the storage medium surface from the heater electric power amount at the point when the magnetic disk contact of the head is determined by the contact determination unit 144. Specifically, the flying height is measured by multiplying the heater electric power amount P(i) of the contact determination value by a corresponding value e of the heater protrusion sensitivity 98 shown in the flying height control information table 50 of FIG. 5; and this is output as a measured flying height and stored at a position in the control information table 50 of FIG. 5 as the flying height 94. In a process of the first embodiment in the contact determination unit 144 of FIG. 8, when a mean amplitude of a current time is μ(i), a mean amplitude of a previous time is μ(i−1), heater electric power of the current time is P(i), and heater electric power of the previous time is P(i−1), the ratio {Δμ(i)/ΔP} of the changed amount Δ(μi) of the mean amplitude with respect to the changed amount ΔP between heater electric power of the previous time and the current time is calculated as a contact determination value S1(i) The contact determination value S1(i) in the first embodiment can be provided by the following expression.

$$S1(i) = \frac{\mu(i) - \mu(i-1)}{P(i) - P(i-1)} \quad (3)$$

Figure 10A:
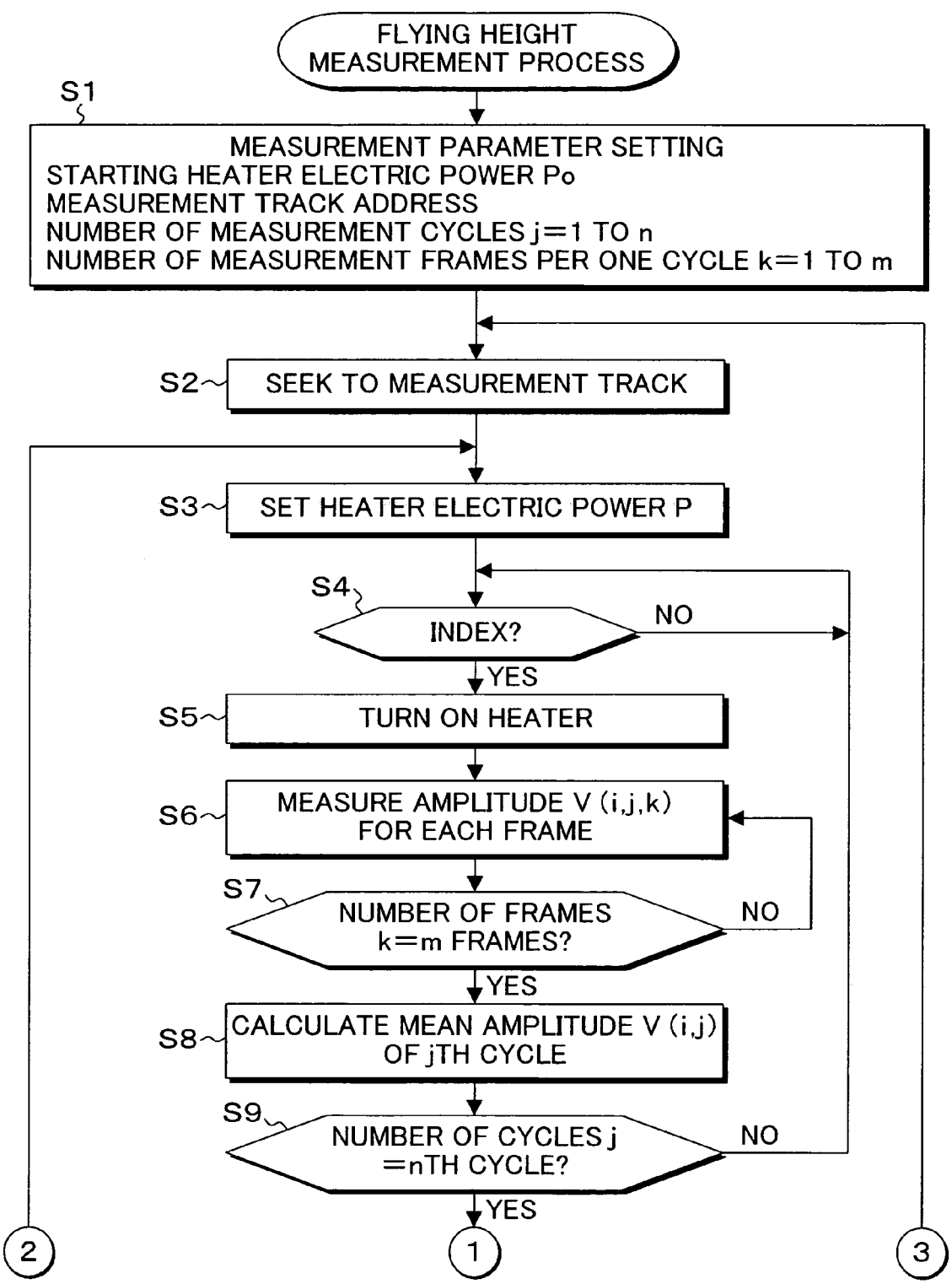
FIGS. 10A and 10B are flow charts showing a first embodiment of a flying height measurement process according to the present invention.
Figure 10B:
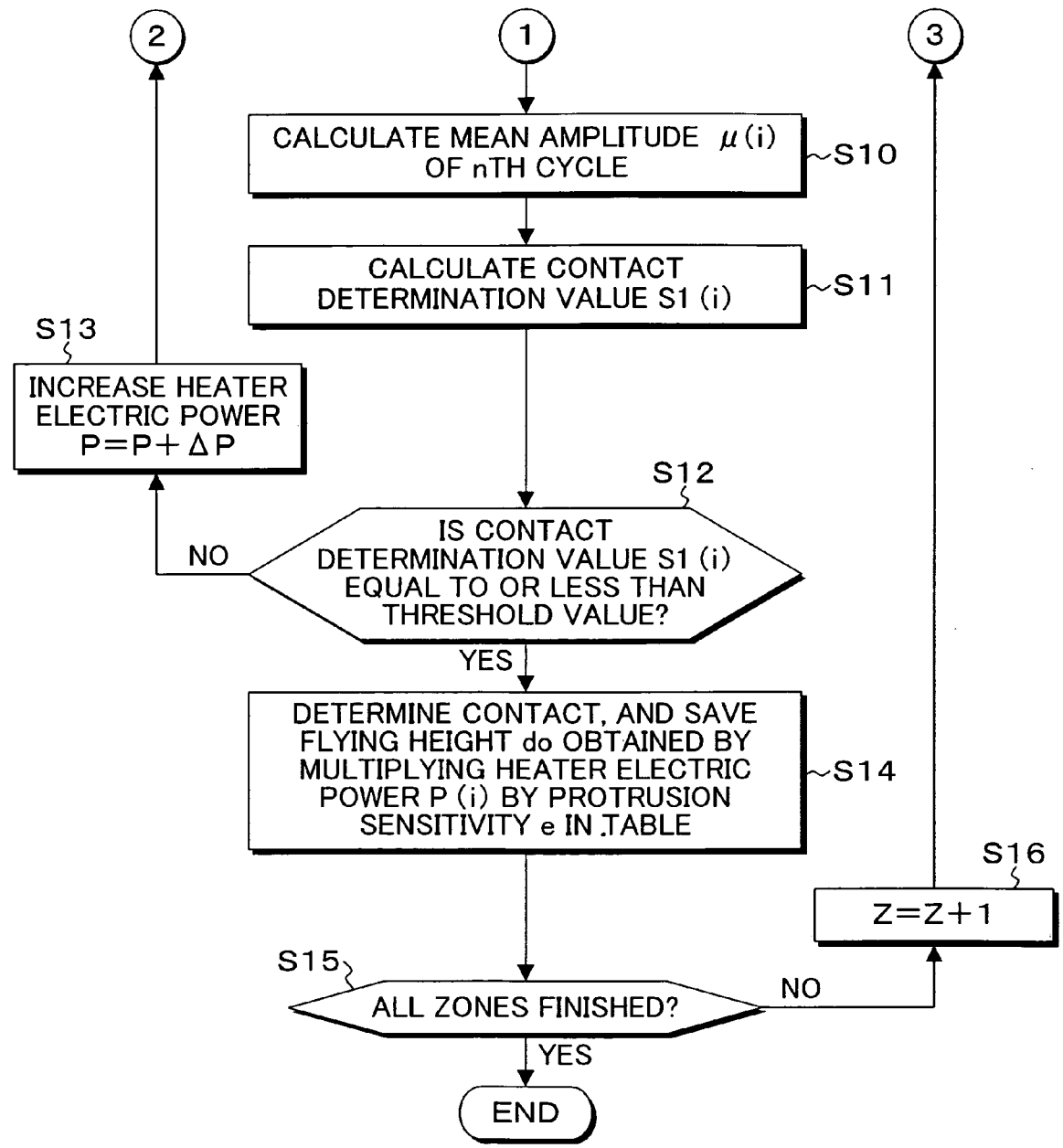

FIGS. 10A and 10B are flow charts showing the first embodiment of the flying height measurement process according to the present invention. In the flying height measurement process of the first embodiment, in the first place, measurement parameters are set in step S1. The measurement parameters set herein are, for example, the following.
(1) Starting heater electric power P0 (0 or a predetermined value)
(2) Measurement track address (zone unit)
(3) Number of measurement cycles j=1 to n (wherein, n is a value in the range of 10 to 100)
(4) The number of measurement frames per one cycle k=1 to m (wherein, m is a frame number within ½ cycle)

Next, in step S2, seek of the head to a measurement track of a measurement starting zone is performed. Next, in step S3, the heater electric power P is set to the starting heater electric power P0. The heater starting electric power P0 is 0 or a predetermined value. Next, the index used as the rotation reference value of the magnetic disk is checked in step S4; and, when the index is obtained, the process proceeds to step S5 in which the heater is turned on to start heating of the head. In this state, the amplitude V(i, j, k) of a preamble read signal is measured for each frame in step S6. Subsequently, whether the frame number k has reached m frames which is the frame number per one rotation or not is checked in step S7, and the amplitude measurement of step S6 is repeated until it reaches the m frames. When the frame number reaches m frames in step S7, the process proceeds to step S8 in which the mean amplitude V(i, j) of the amplitude measured values corresponding to the m frames obtained in the jth cycle, in this case, a first cycle is measured. Subsequently, whether the cycle number j has reached nth cycle or not is checked in step S9; and, if it has not reached the nth cycle, the process returns to step S4 in which the index is checked, and a similar measurement processes is repeated. When the cycle number j has reached the n cycles in step S9, the process proceeds to step S10 in which the mean amplitude μ of the n cycles is calculated. In the present embodiment, after the mean amplitude of the frame number m per one rotation is calculated in step S8, the mean amplitude of the n cycles is calculated in step S10; however, the mean amplitude μ(i) may be calculated at a time at the timing of step S10 wherein measurement amplitudes of n cycles with the m frames per on rotation are obtained. Next, the process proceeds to step S11 in which the contact determination value S1(i) is calculated by the expression (3). Herein, in order to calculate the contact determination value S(i) the previous mean amplitude μ(i-1) is required with respect to the mean amplitude μ(i) of the present time; thus, it is not calculated in the measurement of i=1st time, but the contact determination value S1(i) is calculated in a second time or latter. In a first time, the contact determination value S1(i) may be calculated while assuming that the current mean amplitude μ(i) and the previous mean amplitude μ(i-1) are the same value. Subsequently, the process proceeds to step S12 in which whether the contact determination value S1(i) is equal to or less than a predetermined threshold value is checked. When it is larger than the threshold value, the process proceeds to step S13 in which the heater electric power P is increased by ΔP, the process returns to step S3 again, and a similar measurement process is repeated. When the measurement process is repeated in this manner while sequentially increasing the heater electric power by ΔP, the contact determination value S1(i) is determined to be equal to or less than the threshold value in step S12, and the process proceeds to step S14 in which contact with the magnetic disk is determined, and the flying height do which is the heater electric power P(i) at that point multiplied by the protrusion sensitivity e is calculated, output as a measurement result, and operated at a corresponding position in the control information table 50 of FIG. 5. Subsequently, the process proceeds to step S15 in which whether all zones are finished or not is checked; if they are not finished, the zone number is increased by one in step S16, and the process from step S2 is repeated.

Figure 11:
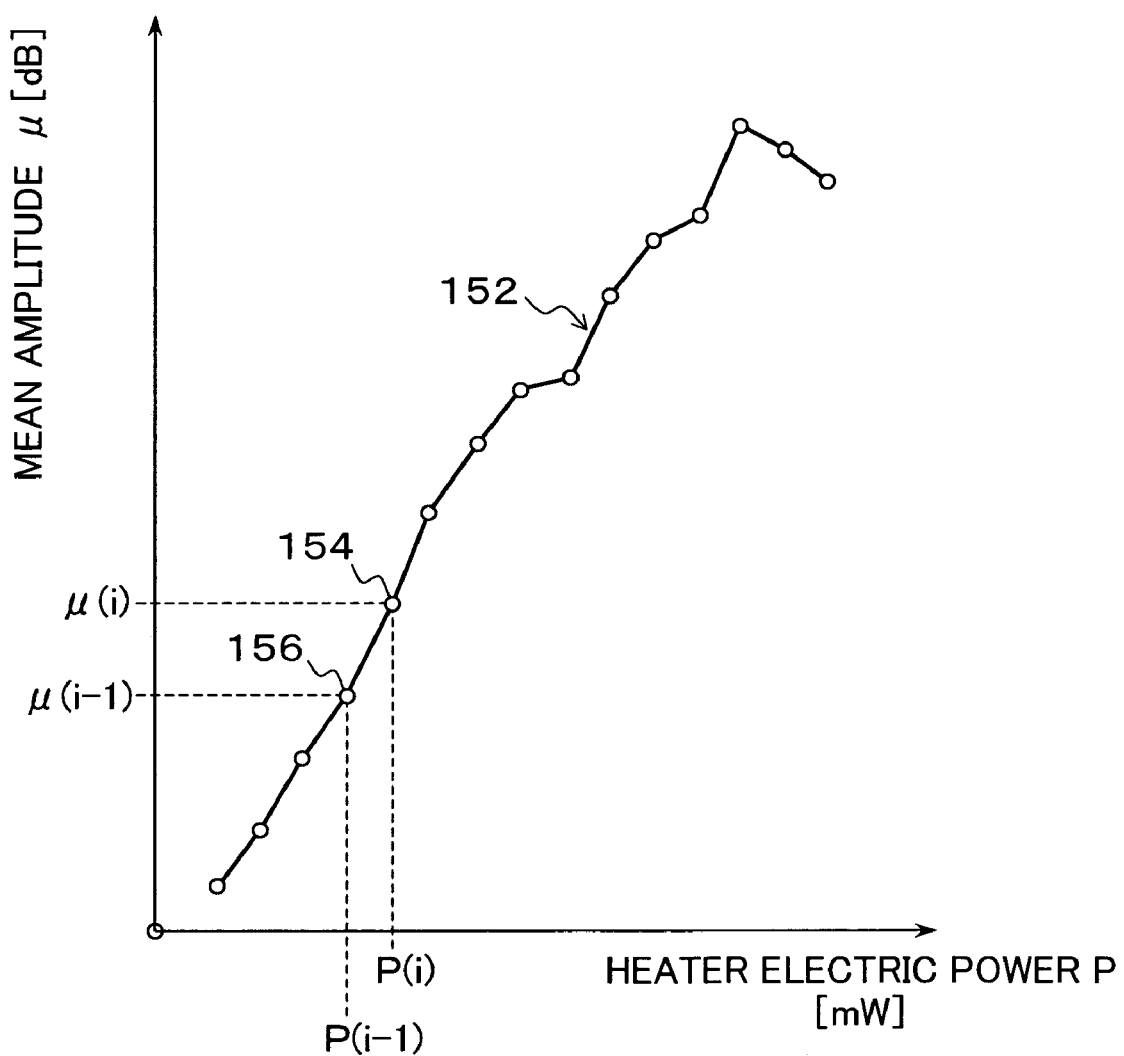
FIG. 11 is an explanatory diagram of the contact determination value s1(i) calculated in the embodiment of FIGS. 10A and 10B.

FIG. 11 is an explanatory diagram of the contact determination value calculated in step S11 of FIGS. 10A and 10B. FIG. 11 shows the heater electric power P in the horizontal axis, and the vertical axis represents the mean amplitude μ. The heater electric power P is sequentially increased by the predetermined value ΔP from P=0. Along with this, the flying height with respect to the magnetic disk caused by protruding the head by heater heating is reduced, and the amplitude of the preamble read signal is increased along with the reduction of the flying height; thus, the mean amplitude μ calculated from measured amplitudes is also sequentially increased. Herein, in a measurement characteristic 152, when a current measurement point is 154, and a previous measurement point is 156, the heater electric power of the current measurement point 154 is P(i), and the mean amplitude thereof is μ(i); the previous heater electric power is P(i-1), and the mean amplitude thereof is μ(i-1). The contact determination value S1(i) calculates the inclination of the straight line connecting the measurement point 154 and the measurement point 156.

Figure 12:
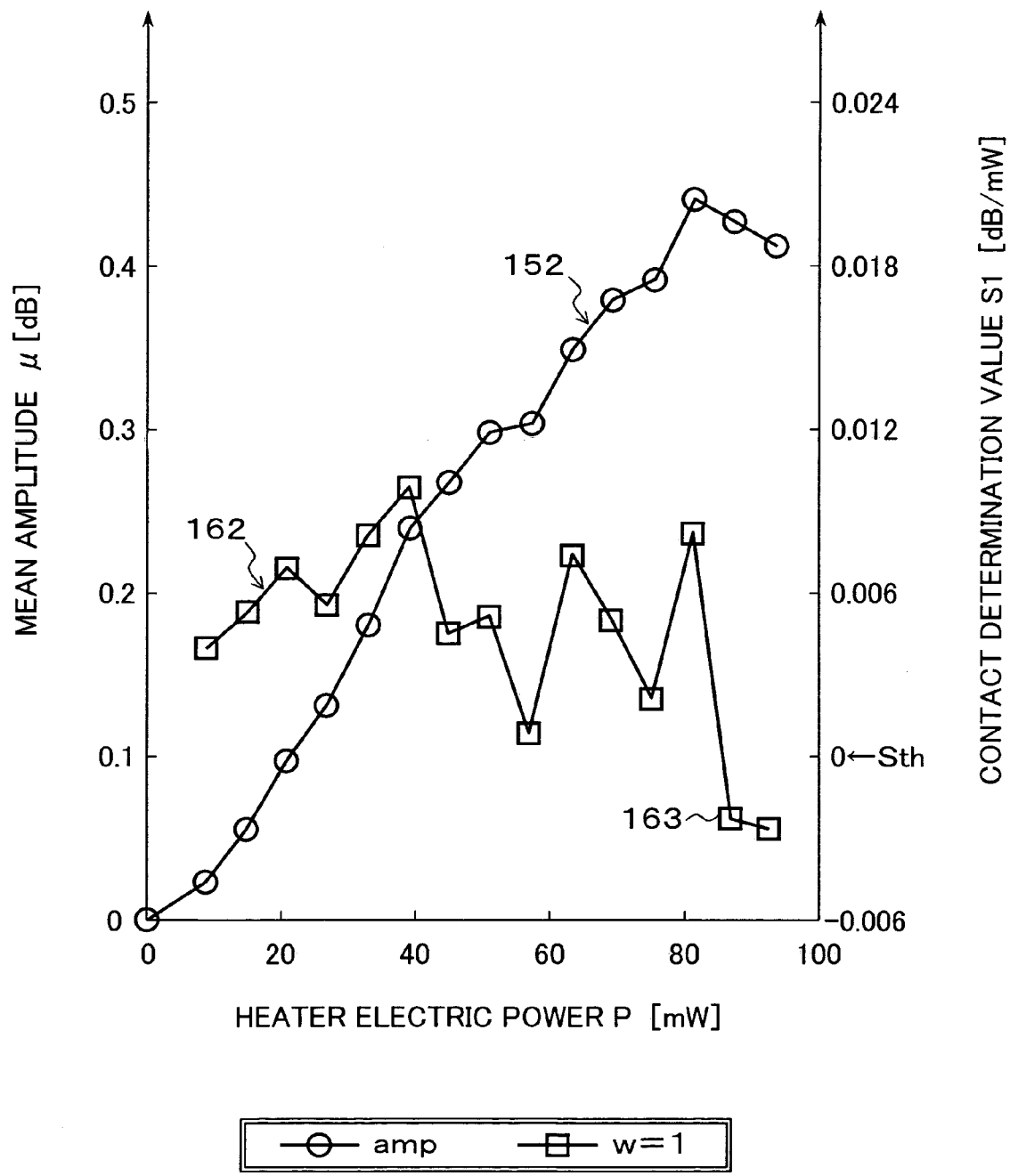
FIG. 12 is a graph diagram showing actual measurement results of the mean amplitude and contact determination value with respect to the heater electric power in the first embodiment of FIGS. 10A and 10B.

FIG. 12 is a graph diagram of measurement results showing the relation of the mean amplitude and the contact determination value with respect to the heater electric power in the first embodiment shown in the flow chart of FIGS. 10A and 10B. In FIG. 12, a measurement curve 152 represents the mean amplitude μ, and a measurement curve 162 represents the contact determination value S1. In this case, the cycle number n of the measurement curves 152 and 162 is n=50. For the measurement curve 162 of the contact determination value S1, a threshold value Sth for determining the contact with the magnetic disk is set as Sth=0. Therefore, when a measurement point 163 at which the measurement characteristic 162 of the contact determination value S1 is equal to or less than the threshold value Sth=0 along with increase of the heater electric power P, it is determined that the head is in contact with the magnetic disk, and the flying height do is calculated by multiplying the heater electric power at this point by the protrusion sensitivity e. Herein, as shown by the measurement curve 162 of the contact determination value S1, amplitudes due to variation of the measurement are repeated overall, the amplitudes are large even when the mean amplitude of the amplitude measurement which is the frame number m multiplied by the cycle number n is used, and the possibility of erroneous detection can be assumed to be comparatively high. However, when the threshold value is set as Sth=0, and the contact is determined when it is equal to or less than 0, errors due to the amplitudes in the intermediate stage before that can be avoided.

Figure 13A:
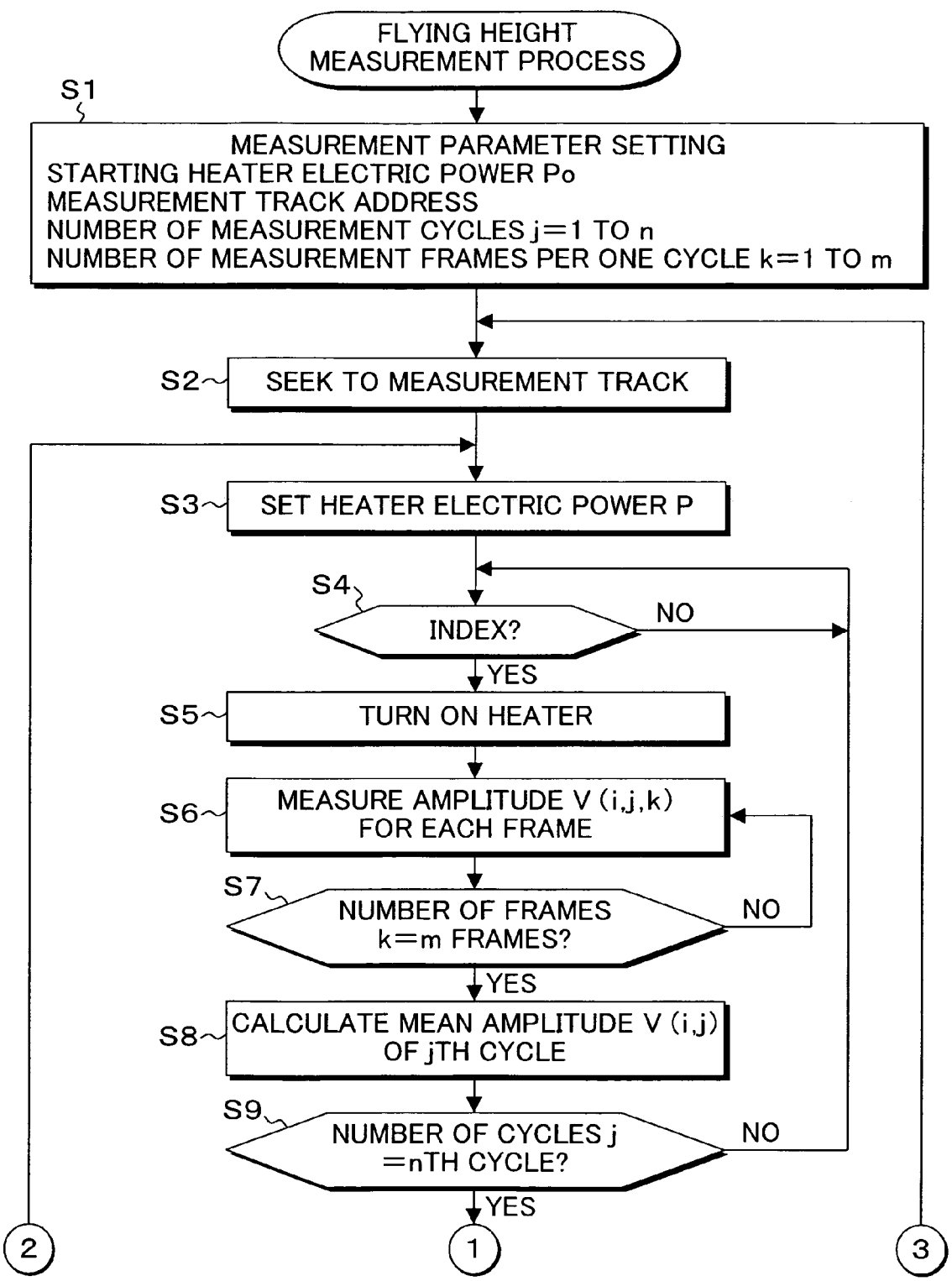
FIGS. 13A and 13B are flow charts showing a second embodiment of the flying height measurement process according to the present invention.
Figure 13B:
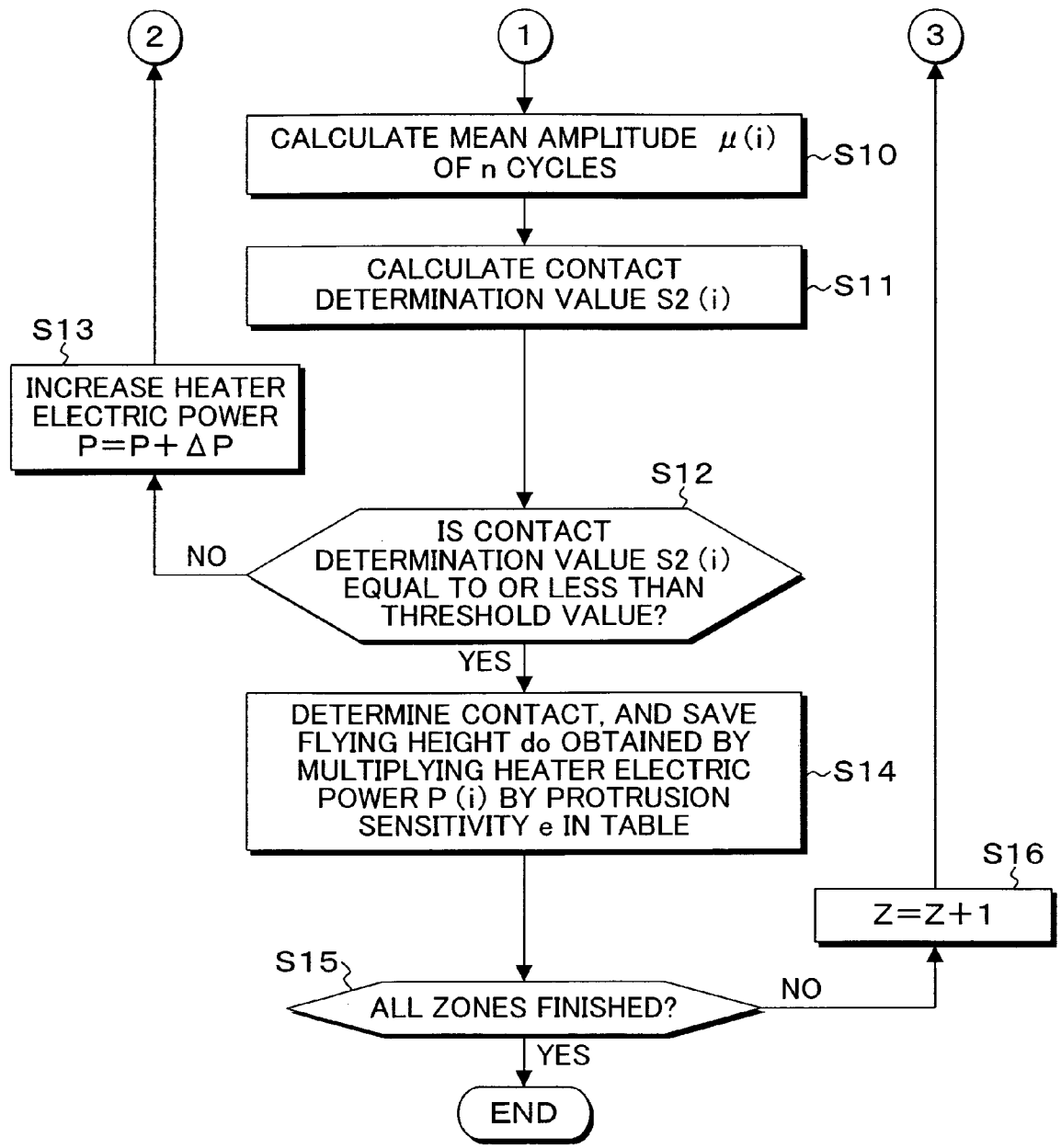

FIGS. 13A and 13B are flow charts showing the second embodiment of the flying height measurement process according to the present invention. In the second embodiment of the flying height measurement process, the process of the contact determination unit 144 of FIG. 8 is different from the first embodiment of FIGS. 10A and 10B.

Figure 14:
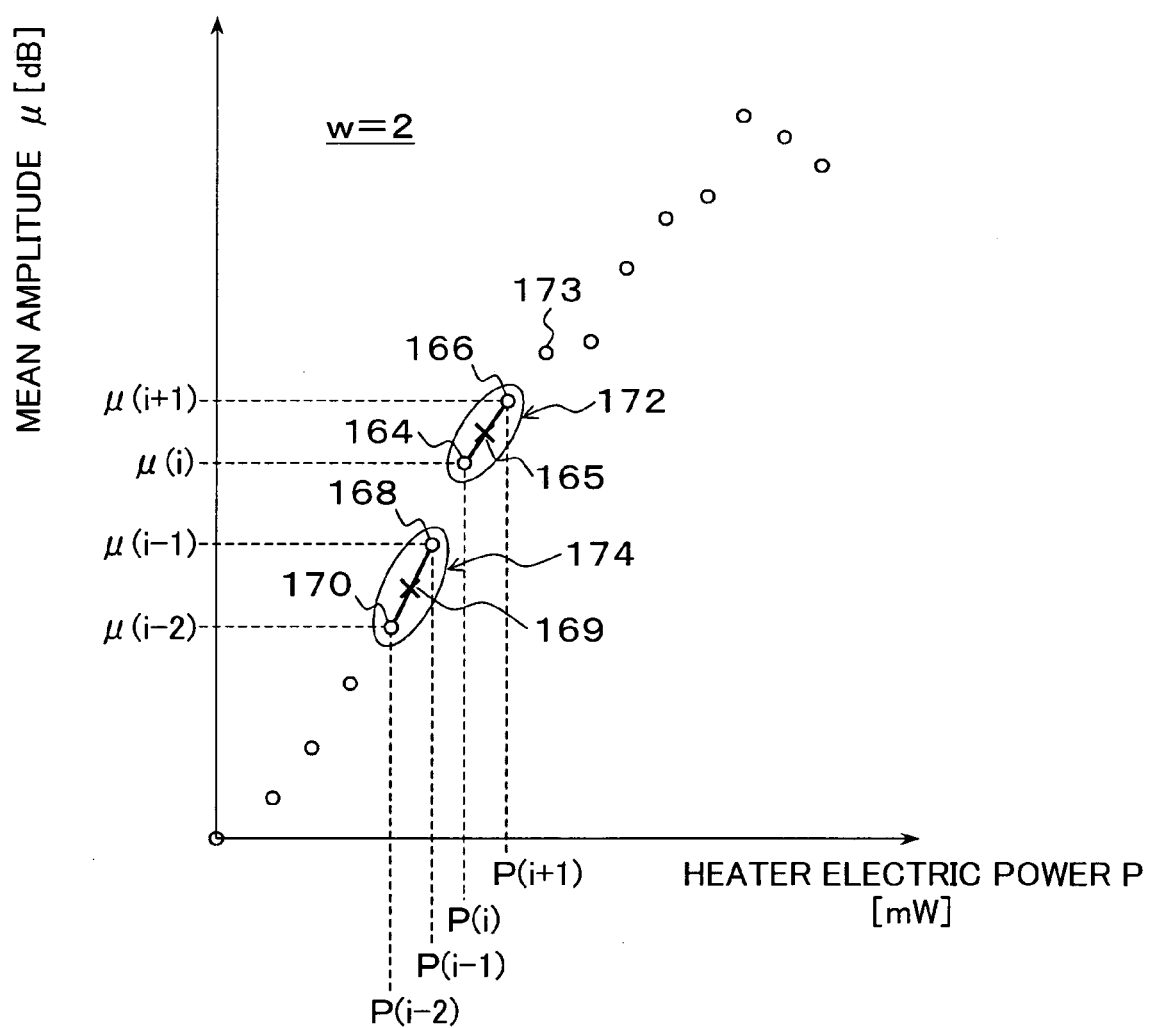
FIG. 14 is an explanatory diagram of the contact determination value S2(i) in the case in which w=2 in the second embodiment of FIGS. 13A and 13B.

FIG. 14 shows a calculation principle of a contact determination value S2(i) in the second embodiment of the flying height measurement process. FIG. 14 shows the mean amplitude μ obtained from the measurement amplitude of the preamble read signal with respect to the heater electric power P of the horizontal axis and shows measurement points by circles. When a current measurement point to which attention is focused on for the calculation process herein is 164, a next measurement point is 166, a previous measurement point is 168, and a measurement point before the previous one is 170, the heater electric power at the measurement points 164, 166, 168, and 170 are disposed along with the time course as P(i−2), P(i−1), P(i), P(i+1).

The mean amplitude is disposed along with the time course as

μ(i−2), μ(i−1), μ(i), μ(i+1).

In the second embodiment, with respect to such four successive measurement points 164, 166, 168, and 170, the measurement point 164 to which attention is focused on for calculation is combined with the next measurement point 166 so as to form a two-point group 172, and the previous and before-previous measurement points 168 and 170 are combined so as to similarly form a two-point group 174. Then, mean measurement points 165 and 169 are calculated respectively for the two-point groups 172 and 174, and a variation rate of the mean measurement points 165 and 169 is calculated as the contact determination value S2(i). The calculation of the contact determination value S2(i) in the second embodiment can be provided by the following expression.

$$S2(i) = \frac{(1/w)\sum_{\alpha=0}^{w-1}\mu(i+\alpha) - (1/w)\sum_{\alpha=1}^{w}\mu(i-\alpha)}{w} \quad (4)$$

In the expression (4), when a measurement time point is a present time point i, a future measurement time point is i+α, and a past measurement point is i−α (wherein α is an integer of 1, 2, 3 . . . ), a first mean (the right side of the numerator of the expression (1), which is a mean amplitude of future w measurement points from α=0 to α=−1 including the present time point i, and a second mean, i.e., the right side of the numerator of the expression (4), which is a mean amplitude of past w measurement points from α=1 to α=0, are obtained, and the contact determination value S2(i) is further calculated as a variation rate of the first mean and the second mean with respect to a second heater electric power amount. The value of w in the expression (4) herein determines the number of the measurement points included in a group for obtaining a mean measurement point as shown in FIG. 14, and FIG. 14 is the case in which the two-point groups 172 and 174 have w=2. The second embodiment of the flying height measurement process of FIGS. 13A and 13B which calculates the contact determination value S2(i) by the above described expression (4) is same as the first embodiment of FIGS. 10A and 10B until the calculation of the mean amplitude μ(i), that is, steps S1 to S10, and the calculation of the contact determination value S2(i) of the expression (4) is performed in step S11. Then, when the contact determination value S2(i) is larger than a threshold value in step S12, the heater electric power is increased by ΔP in step S13, and the process from step S3 is repeated; and, when it is equal to or less than the threshold value, the process proceeds to step S14, in which contact is determined, and the flying height do is calculated by multiplying the heater electric power ΔP(i) at that point by the protrusion sensitivity e and put onto the table. This is repeated until all the zones are finished in step S15.

Figure 15:
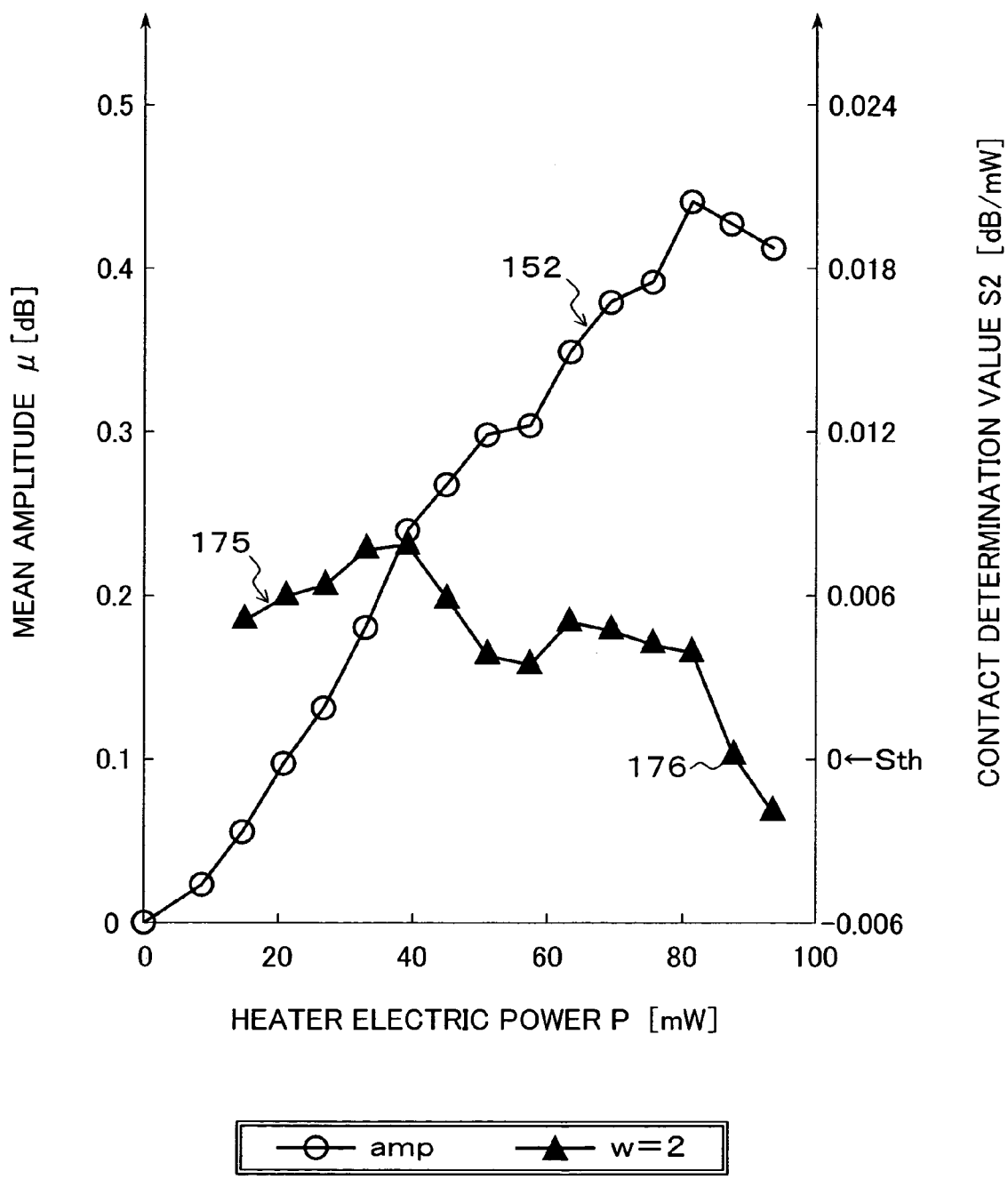
FIG. 15 is a graph diagram showing actual measurement results of the mean amplitude and contact determination value with respect to the heater electric power in the case of FIG. 14 in which w=2.

FIG. 15 is a graph diagram of measurement results showing the relation of the mean amplitude μ and a contact determination value S2 with respect to the heater electric power when w=2 in the expression (4). In FIG. 15, a measurement curve 152 of the mean amplitude μ is same as FIG. 12, and a measurement curve 175 represents the contact determination value S2 calculated from the above described expression (4) when w=2. In the contact determination value S2, the amplitude due to the measurement variation is significantly suppressed and smoothed compared with the contact determination value S1 which is a simple variation rate of the mean amplitude shown in FIG. 12. Also in this case, Sth=0 is set as the threshold value for determining the contact with the magnetic disk, contact with the magnetic disk is determined when it reaches the threshold value Sth at a measurement point 176, and the flying height do is calculated by multiplying the heater electric power of the measurement point 176 by the protrusion sensitivity e and stored in the table.

Figure 16:
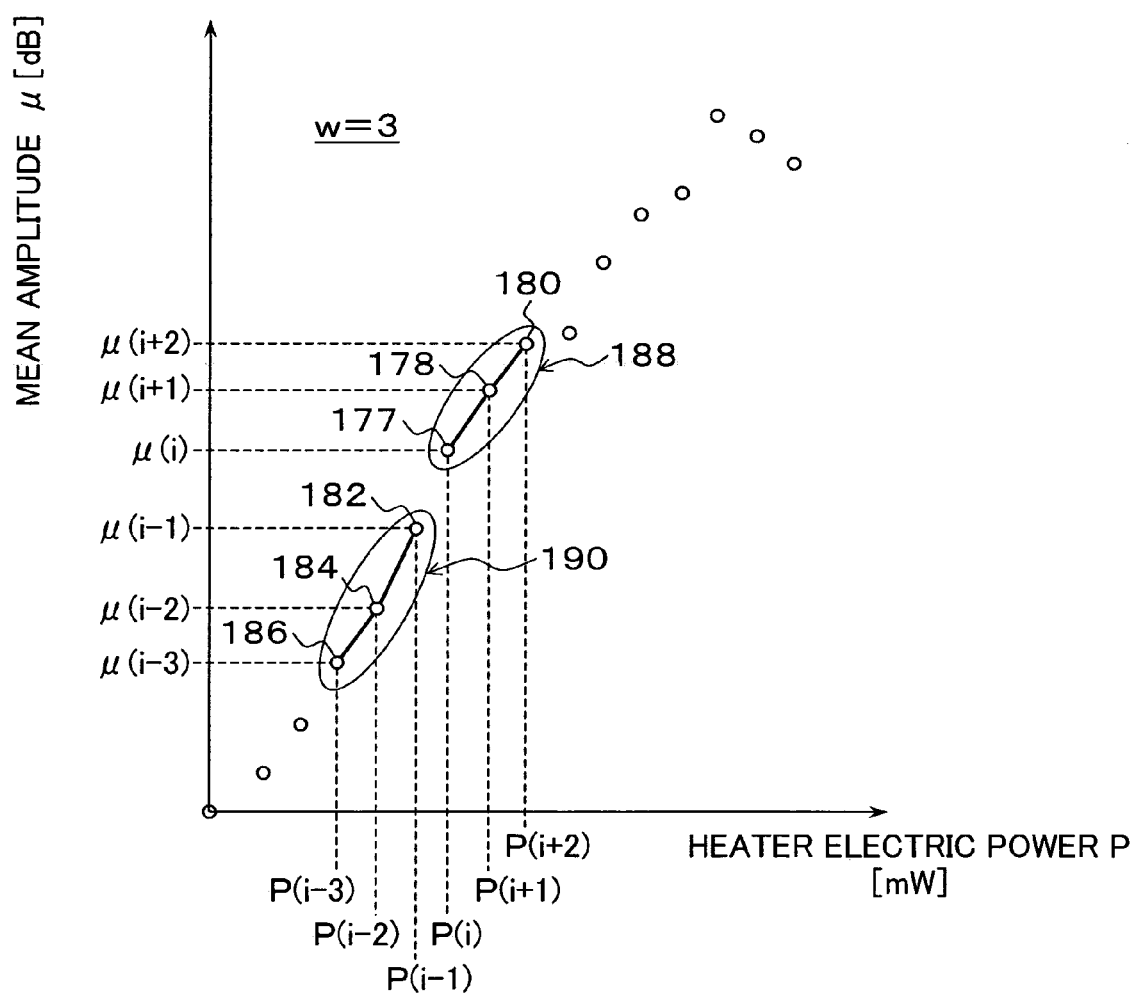
FIG. 16 is an explanatory diagram of the contact determination value S2(i) in the case in which w=3 in the second embodiment of FIGS. 13A and 13B.

FIG. 16 illustrates a calculation process of the case in which w in the expression (4) which calculates the contact determination value S2 of step S11 is w=3 in the second embodiment of the flying height measurement unit process of FIGS. 13A and 13B. In this case in which w=3, with a measurement point 177 of a present time point to which attention is focused on as a calculation object, a next measurement point 178 and a measurement point 180 after the next form a three-point group 188 corresponding to w=3. In addition, with respect to the present measurement point 177, a three-point group 190 is formed by three points, a previous measurement point 182, a measurement point 184 before the previous one, and a measurement point 186 which is further before that by one point. Then, after a mean measurement point is obtained for each of the three-point groups 188 and 190, the variation rate of the measurement points between the groups is obtained.

Figure 17:
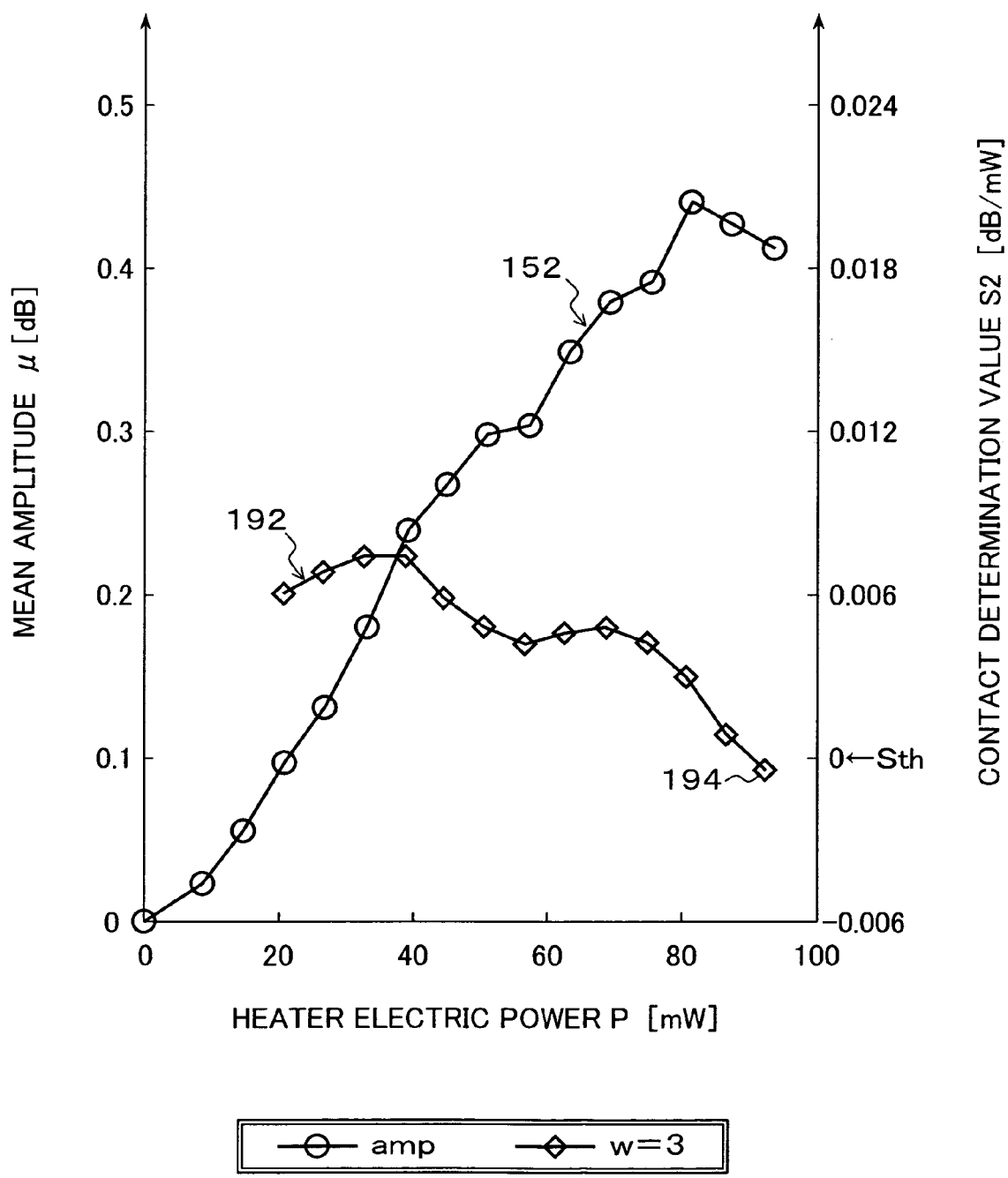
FIG. 17 is a graph diagram showing actual measurement results of the mean amplitude and contact determination value with respect to the heater electric power in the case of FIG. 14 in which w=3.

FIG. 17 is a graph diagram of measurement results showing the relation of the mean amplitude μ and the contact determination value S2 with respect to the heater electric power when w=3. In FIG. 17, the measurement curve 152 of the mean amplitude μ is same as FIG. 12, and the contact determination value S2 when w=3 is a measurement curve 192. The measurement curve 192 is further smoothed compared with the case of FIG. 15 in which w=2, contact of the head with the magnetic disk is determined from a measurement point 194 at which the threshold value Sth=0, and the flying height d0 is obtained by multiplying the heater electric power of the measurement point 194 by the protrusion sensitivity e and stored in the table. Herein, in the calculation of the contact determination value S2 calculated by forming two groups including measurement points corresponding to the value of w shown in FIG. 14 and FIG. 16, for example, after attention is focused on the measurement point 164 so as to calculate the current contact determination value S2(i) as a calculation of the present point like FIG. 14, the next calculation uses the measurement point 166 as a measurement point of a present time point, a two-point group including the next measurement point 172 is formed; meanwhile, as a past two-point group, a group is formed by the measurement points 164 and 168, and the process of the calculation by the expression (4) is processed. For the calculation of the contact determination value S2(i) by the expression (4), (2×w) measurement points are always required as measurement points; therefore, the calculation process of an initial step is not performed until the measurement points required for the calculation are obtained, and the calculation is started from the point when the (2×w) measurement points are obtained.

Figure 18:
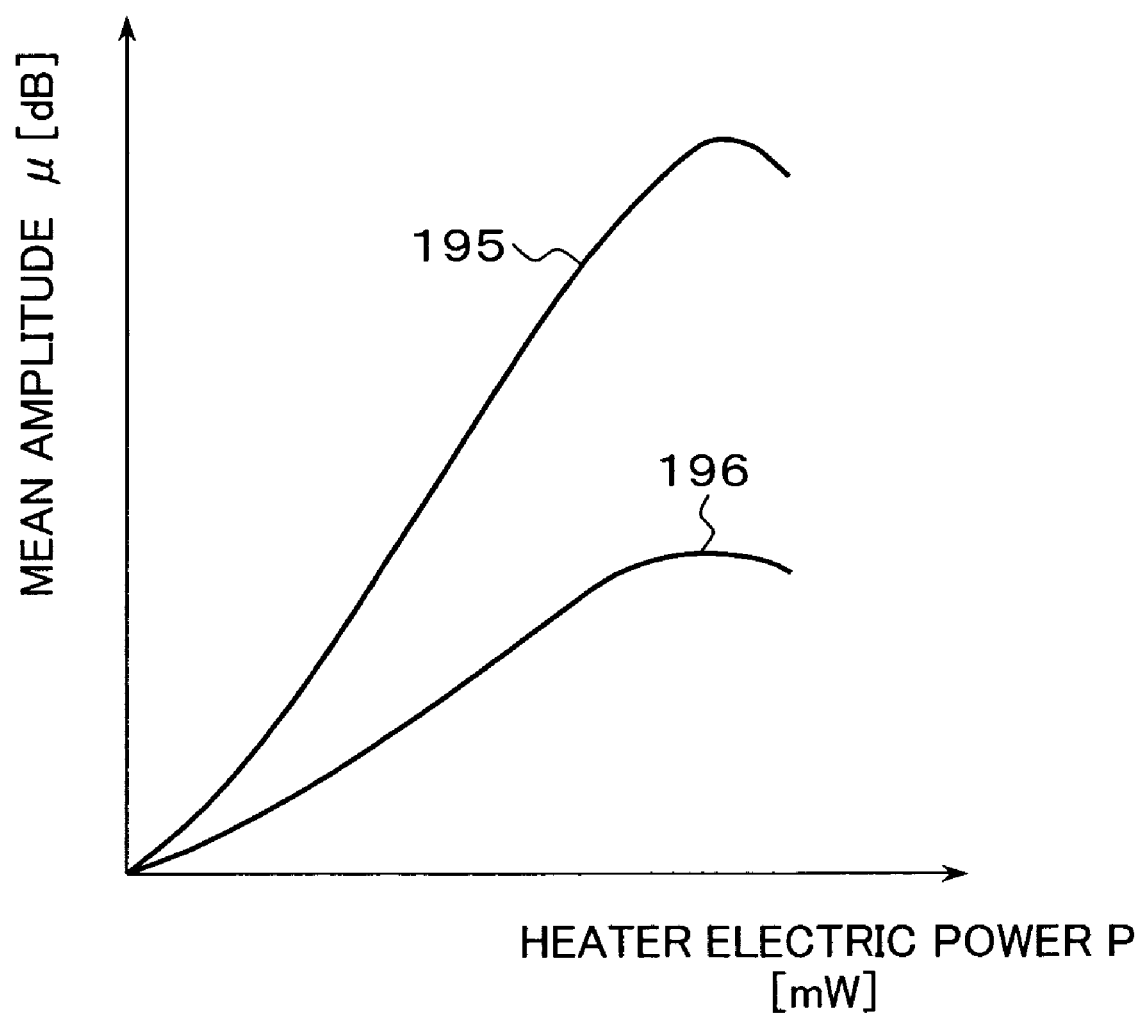
FIG. 18 is an explanatory diagram showing difference between characteristics of the mean amplitude with respect to the heater electric power in inner and outer measurement tracks.
Figure 19A:
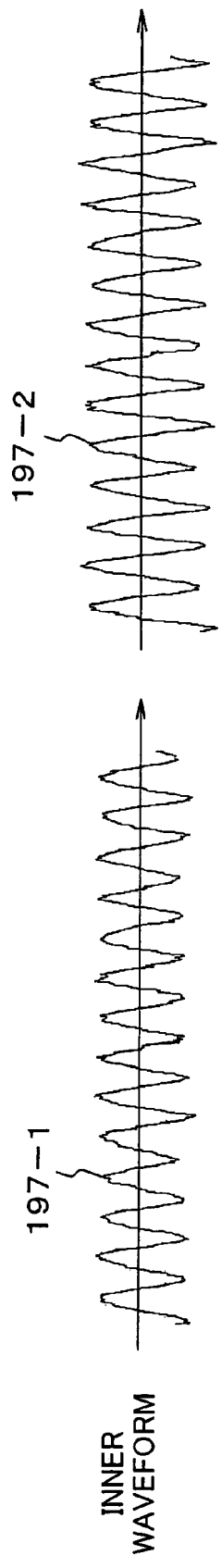
FIGS. 19A and 19B are explanatory diagrams showing difference between read waveforms at inner and outer measurement tracks with respect to heater electric power.
Figure 19B:
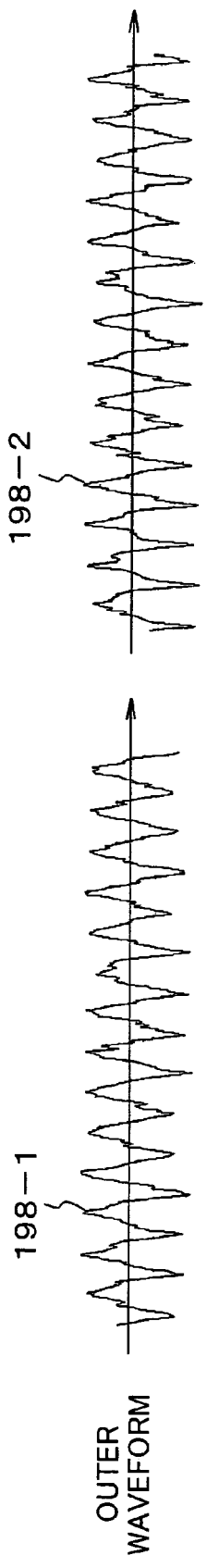

FIG. 18 is an explanatory diagram showing differences between characteristics of the mean amplitude with respect to the heater electric power in inner and outer measurement tracks of the magnetic disk apparatus, and FIGS. 19A and 19B are explanatory diagrams showing differences between signal waveforms with respect to the heater electric power in the inner and outer measurement tracks. As the characteristics of the mean amplitude μ of FIG. 18 with respect to the heater electric power P, an inner characteristic 195 and an outer characteristic 196 are shown. The amount of variation in the mean amplitude μ obtained from preamble read signals is larger in the inner characteristic 195 than the outer characteristic 196, and the amount of variation is small in the outer characteristic 196 side. This is due to the recording state of the preamble signals in the inner track and the outer track. In other words, as shown in the magnetic disk of FIG. 9A, the servo areas are recorded in the radial directions from the center at equal angles, the recording width is shorter in the inner side, and the recording width is longer in the outer side. Read (record) frequencies are constant in the inner and outer circumferences.

FIG. 19A shows inner waveforms of the preamble read signals; wherein the inner waveform 197-1 is in the case in which electric power is not distributed to the heater and the head flying height is large, and the inner waveform 197-2 is in the case in which the flying height is reduced by heater electric power distribution. The inner waveform 197-1 having a high recording density has a sine waveform when the flying height is large since the recording length is short; however, when the flying height is reduced by heater electric power distribution, the amplitude is largely increased as shown in the inner waveform 197-2 due to interference between the waveforms, and, as a result, a large variation in the mean amplitude μ shown in the inner characteristic 195 of FIG. 18 is caused. On the other hand, in the outer waveform of FIG. 19B, an inner waveform 198-1 of the time when electric power is not distributed to the heater has a sufficient amplitude due to waveform interference since the recording length of the preamble read signal is long which leads to a low recording density; and, even when the flying height is reduced by causing it to protrude by distributing electric power to the heater, as shown in an outer waveform 198-2 in the right side, amplitude increase is not so large compared with the inner side, and thus, the characteristic has a small variation in the mean amplitude μ as shown in the outer characteristic 196 of FIG. 18. Therefore, when the inner side is the measurement track, the read amplitude is largely varied by the flying height variation due to protrusion caused by heater electric power distribution, and variation in the measurement also becomes large. Therefore, the measurement frame number m of the preamble read signals per one rotation for calculating the mean amplitude μ is increased for the inner side; meanwhile, the frame number m is reduced for the outer side since the degree of amplitude increase is small. When the frame number m per one rotation used in calculation of the mean amplitude μ is increased in the measurement track of the inner side, a large amplitude variation in the protrusion sensitivity caused by heater electric power distribution in the inner side can be suppressed, and a highly accurate determination result of the medium contact of the head can be obtained.

Figure 20A:
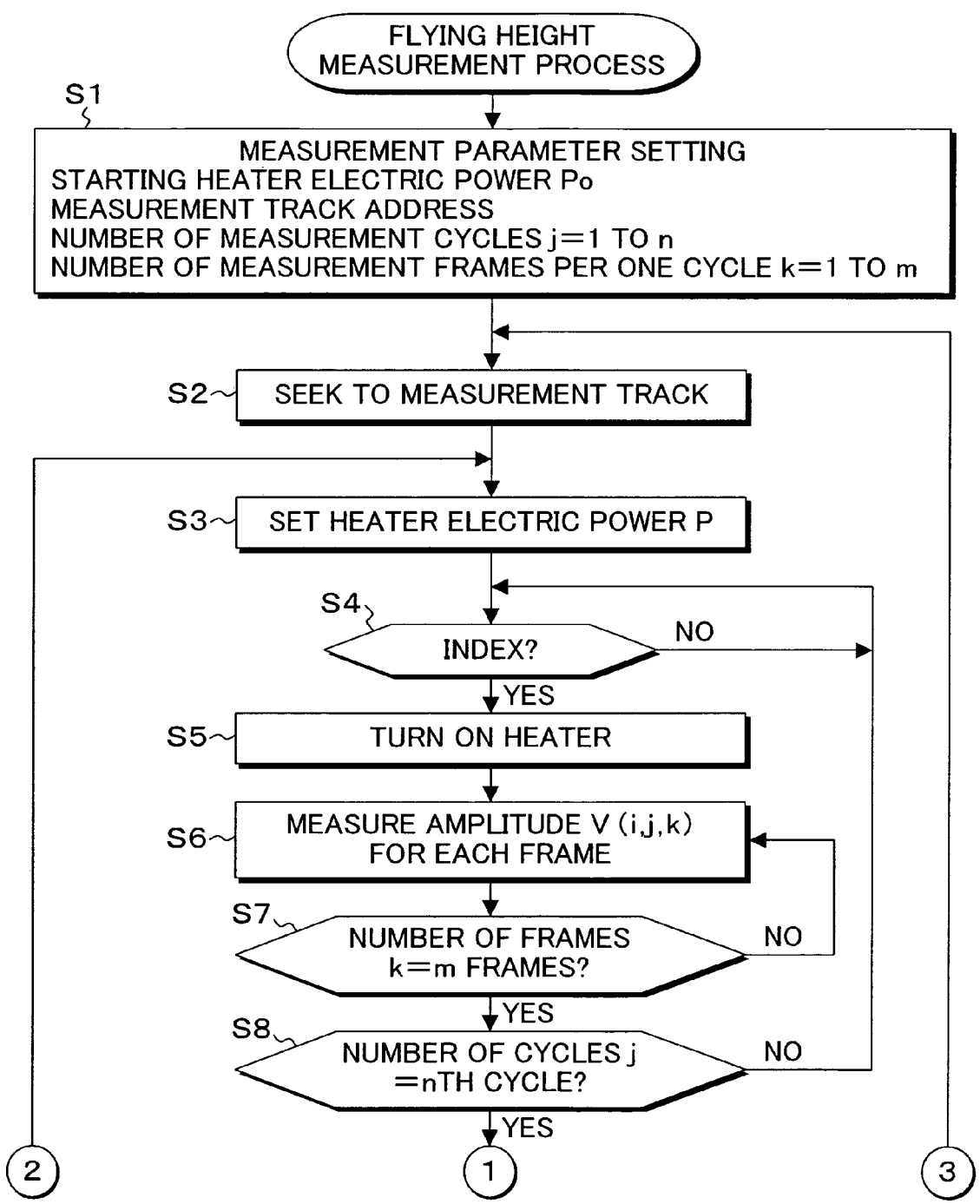
FIGS. 20A and 20B are flow charts showing a third embodiment of the flying height measurement process according to the present invention which determines contact by variance of measured amplitude.
Figure 20B:
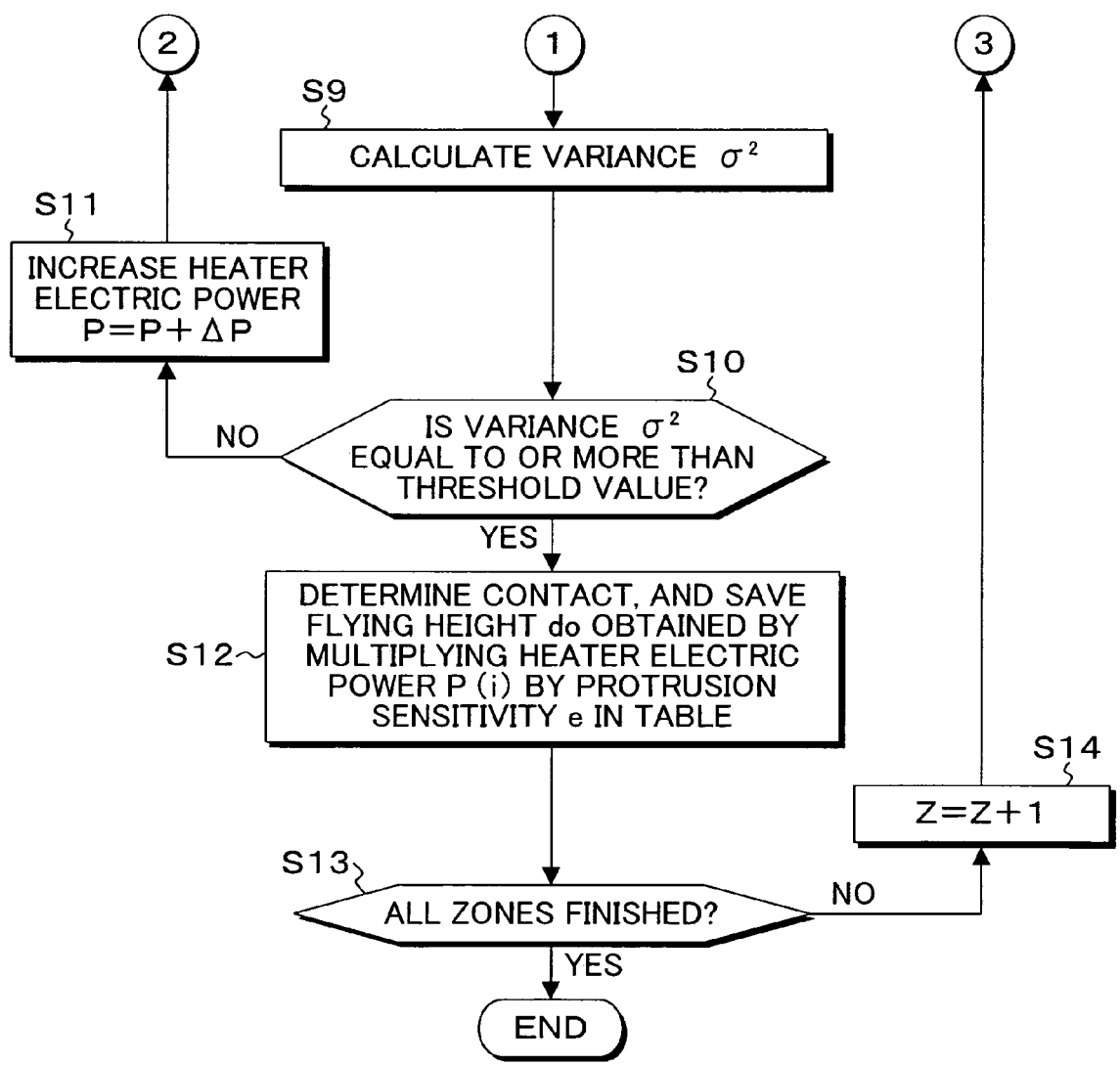

FIGS. 20A and 20B are flow charts showing the third embodiment of the flying height measurement process according to the present invention which determines contact according to a variance or a standard deviation of the measurement amplitude. Processing functions of the third embodiment comprises the amplitude measurement unit 140, the variance calculating unit 148, the contact determination unit 150, and the flying height calculating unit 146 provided in the flying height measurement unit 78 of FIG. 8. In the flying height measurement process of the third embodiment shown in FIGS. 20A and 20B, preamble read signals of m frames are measured per one rotation for a measurement track, this is repeated for a predetermined number of cycles n, a variance σ2 or a standard deviation σ which is a square root thereof is calculated based on the amplitude measurement values of thus-measured (frame number m×cycle number n), it is determined that the head is in contact with the magnetic disk when the variance or the standard deviation is equal to or more than the predetermined threshold value, and a flying height do is obtained by multiplying the heater electric power amount at that point by the heater protrusion sensitivity e and stored in the table. Regarding a mean amplitude V(i, j) per one cycle which is a mean of the amplitude measurement values of the m frames when the heater electric power P(i) is sequentially increased, it is conceivable that a phenomenon that the head jumps due to contact with fine irregularities on the disk surface immediately before it is brought into contact with the magnetic disk occurs; therefore, a phenomenon that the mean amplitude V(i, j) is largely varied due to the jumping immediately before contact is conceivable. Therefore, the variation due to the jumping immediately before contact of the head with the magnetic disk can be captured by the variance, and the contact of the head can be accurately determined. The flying height measurement process of the third embodiment will be described below with reference to FIGS. 20A and 20B. In the first place, in step S1, (1) starting heater electric power Po,
(2) measurement track address,
(3) measurement cycle number n, and
(4) measurement frame number m per one cycle are set as measurement parameters. Herein, in the contact determination according to the variance, the measurement cycle number n is, for example, 10 to 100, meanwhile, the measurement frame number m per one cycle is m=1 or 2. Subsequently, after seek to the measurement track which is for example in a top zone is performed in step S2, the heater electric power is set to the starting heater electric power in step S3, an index is awaited for in step S4, the heater is turned on in step S5, and amplitudes V(i, j, k) of the preamble read signals of set frame number m are measured based on the index in one rotation in step S6. This is repeated until it reaches the frame number m in step S7. Subsequently, whether the cycle number has reached the set n cycles or not is determined in step S8; and, the process from step S4 is repeated if it has not reach that, or the process proceeds to step S9 and the variance σ2 is calculated if it has reached that. The variance σ2 can be calculated by the below expression.

$$\sigma^2 = \frac{\sum_{j=1}^{n} \{V(i, j) - \mu(i)\}^2}{n} \quad (5)$$

Note that, the present embodiment, the standard deviation σ may be calculated instead of the variance. The standard deviation σ can be provided as a square root of the variance. Subsequently, the process proceeds to step S10 in which, for example in the case of the calculation of the variance, whether the variance σ2 is equal to or more than a predetermined threshold value is checked. If it is less than the threshold value, after the heater electric power is increased by a predetermined value ΔP in step S11, the process returns to step S3, and a similar measurement process is repeated. When the heater electric power ΔP is sequentially increased, the flying height is reduced, and the head is brought into contact with the medium at a certain point. At that point, it is determined in step S10 that the variance σ2 is equal to or more than the threshold value, and the process proceeds to step S12 in which contact is determined, and the flying height d0 which is the heater electric power P(i) at that point multiplied by the protrusion sensitivity e is obtained and saved in the table. Subsequently, whether all the zones have been finished are not is checked in step S13. If unfinished, after the zone is increased by one in step S14, the process from step S2 is repeated, and, if measurement of all the zones is finished in step S13, the series of processes is finished.

Figure 21:
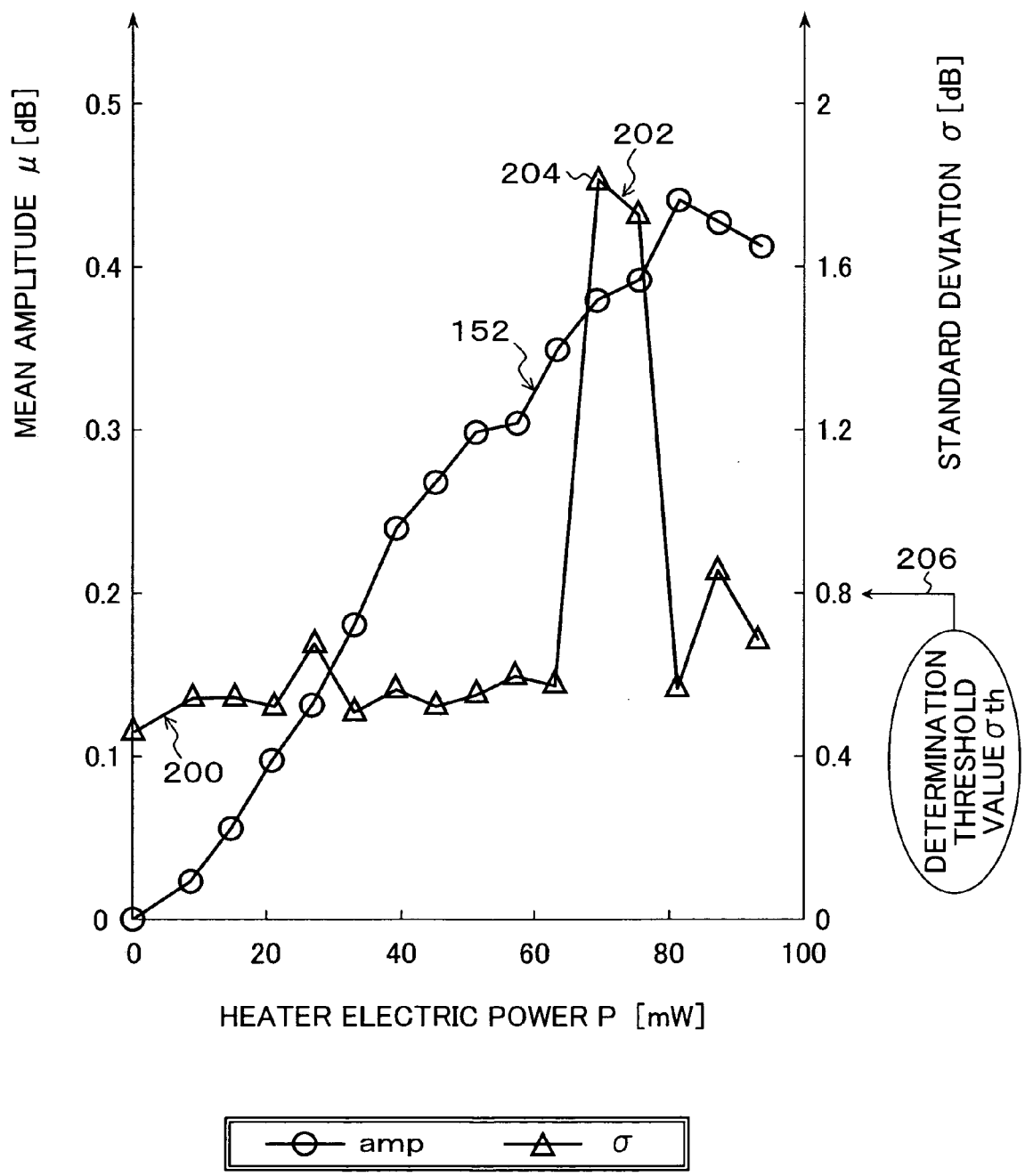
FIG. 21 is a graph diagram showing the relation between heater electric power and standard deviation σ in the third embodiment of FIGS. 20A and 20B.

FIG. 21 is a graph diagram of measurement results showing the relation between the mean amplitude μ and the standard deviation σ in the third embodiment of FIGS. 20A and 20B. In FIG. 21, the measurement curve 152 of the mean amplitude μ is same as FIG. 12, and a measurement curve 200 of the standard deviation σ is provided according to the process of step S9 in the third embodiment of FIGS. 20A and 20B. The measurement curve 200 of the standard deviation σ shows a variation that, although it is smaller than σth, which is set as a determination threshold value, until the heater electric power P is increased to 65 mW, the standard deviation σ is rapidly increased to more than 1.6 when it exceeds 65 mW, and, after this state continues slightly before 80 mW, it returns to less than the determination value σth again. A peak characteristic 202 in the standard deviation σ indicates contact of the had with the magnetic disk; and, for example at a measurement point 204 which exceeds the determination threshold value σth for the first time, contact with the magnetic disk is determined, and the flying height d0 is obtained by multiplying the heater electric power at this point by the heater protrusion sensitivity e.

Figure 22:
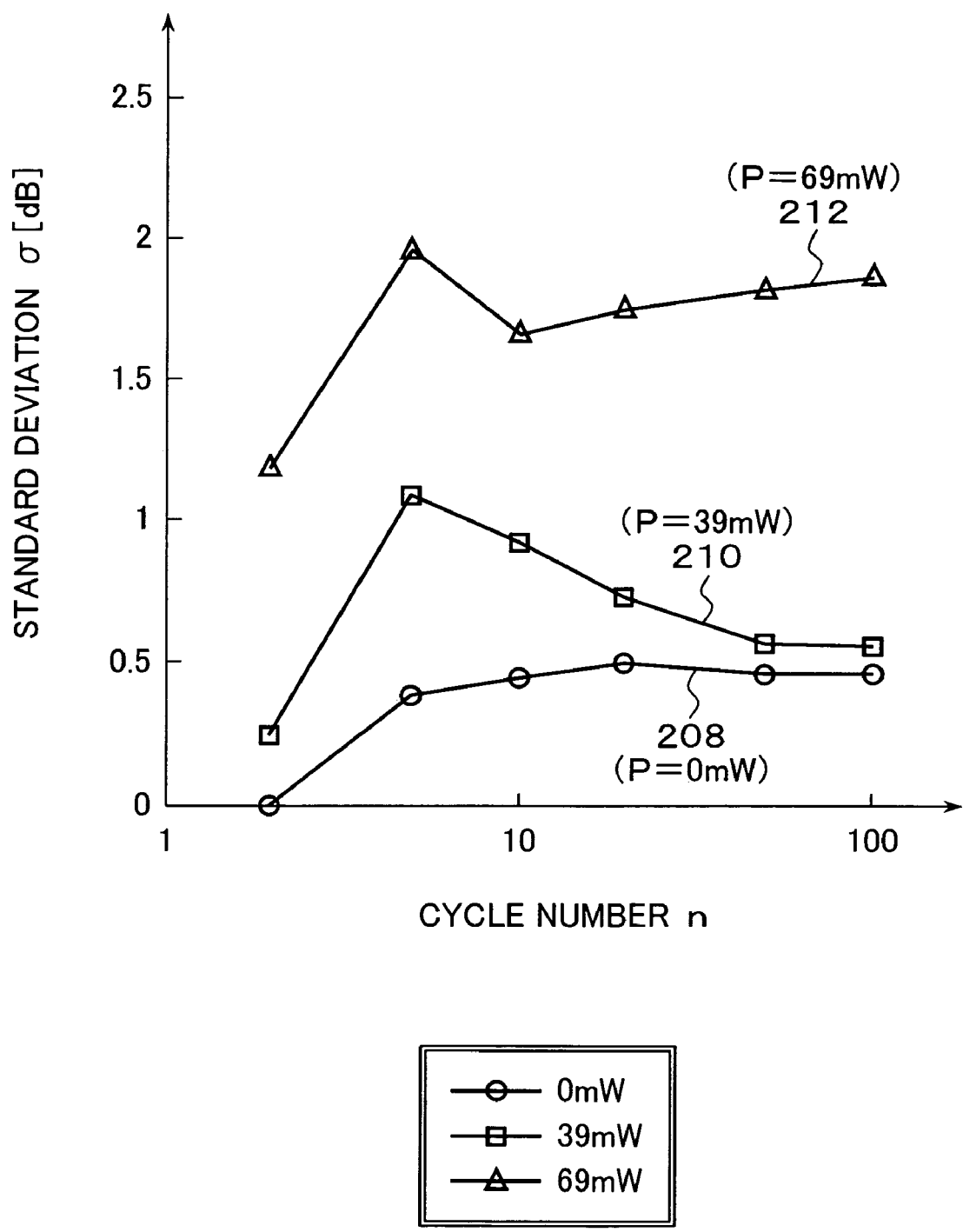
FIG. 22 is a graph diagram showing the relation between standard deviation σ and mean cycle number n in the third embodiment of FIGS. 20A and 20B.

FIG. 22 is a graph diagram showing the relation between the standard deviation σ in the third embodiment of FIGS. 20A and 20B and the frame number m for measuring preamble read signals per one rotation to obtain the mean amplitude. In FIG. 22, a measurement curve 208 is that of the case in which the heater electric power P=0 mW, in other words, there is no heater electric distribution, and the mean amplitude μ is generally stabilized to be constant relative to increase in the cycle number n after exceeding the cycle number n=10. A measurement curve 20 is that of the case in which the heater electric power P=39 mW, and, also in this case, it is generally stabilized to be constant after exceeding the frequency number n. Furthermore, a measurement curve 212 is that of the case of contact start in which the heater electric power P=69 so as to further reduce the heater flying height. The mean amplitude μ is increased overall along with reduction in the flying height; however, it is generally stabilized after exceeding the frequency number n=10. According to the relation between such measurement curves 208, 210, and 212 of FIG. 22, although variation in the mean amplitude μ is large when the cycle number n is less than n=10, the mean amplitude is stabilized to a certain degree after exceeding n=10, and further stabilization is not seen even when n=100 or more; therefore, in the present embodiment, the cycle number n for obtaining the mean of the measurement amplitudes of m frames is n=10 to 100.

Figure 23:
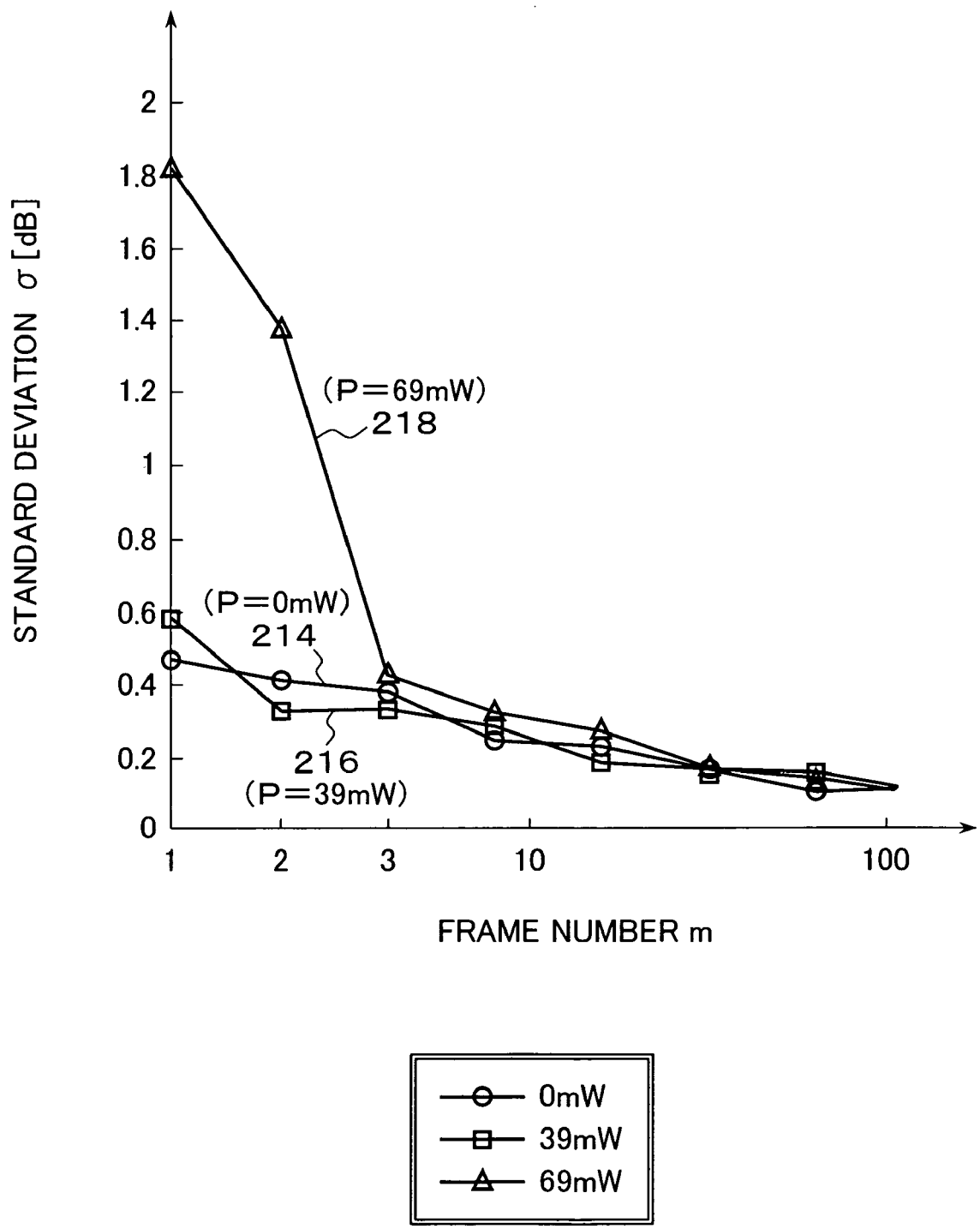
FIG. 23 is a graph diagram showing the relation between the standard deviation σ and mean frame number m in the third embodiment of FIGS. 20A and 20B.

FIG. 23 is a graph diagram showing the relation between the standard deviation σ in the third embodiment of FIGS. 20A and 20B and the frame number m per one rotation for obtaining the mean amplitude. In FIG. 23, a measurement curve 214 is that of the case in which the heater electric power P=0 mW, in other words, there is no heater electric distribution, a measurement curve 216 is that of the case in which the heater electric power P=39 MW, and a measurement curve 218 is that of the case in which the heater electric power P=69 mW. In the measurement curve 214 without the heater electric distribution and the measurement curve 216 of the case in which the heater electric power is small and the head flying height is large, since measurement variation caused by collision between the head and the disk medium does is not generated, the standard deviation is equal to or less than 0.6. On the other hand, when the heater electric power P is increased to 69 mW, in the measurement curve 218 wherein the head is immediately before contact with the magnetic disk or in a state that it is in contact therewith, at the frame number m=1, a large standard deviation, for example, σ=1.8 is generated since the measurement result of one frame per one rotation is used in the calculation of the standard deviation σ without modification. Next, when the frame number m is m=2, variation in the measurement values is equalized, and the standard deviation σ is reduced to σ=1.4. Furthermore, when the frame number m is m=3, the variation thereof is greatly suppressed since a mean of three frames of measurement amplitudes is obtained, and the standard deviation σ is suppressed to the vicinity of 0.4 which is approximately equivalent to the case in which there is no contact. According to the relation of the measurement characteristics 214, 216, and 218 of the standard deviation σ with respect to the frame number m, it can be understood that the frame number m is required to be one frame or two frames in order to accurately detect determination of the head and the magnetic disk by using the standard deviation as the contact determination value according to the third embodiment.

Figure 24:
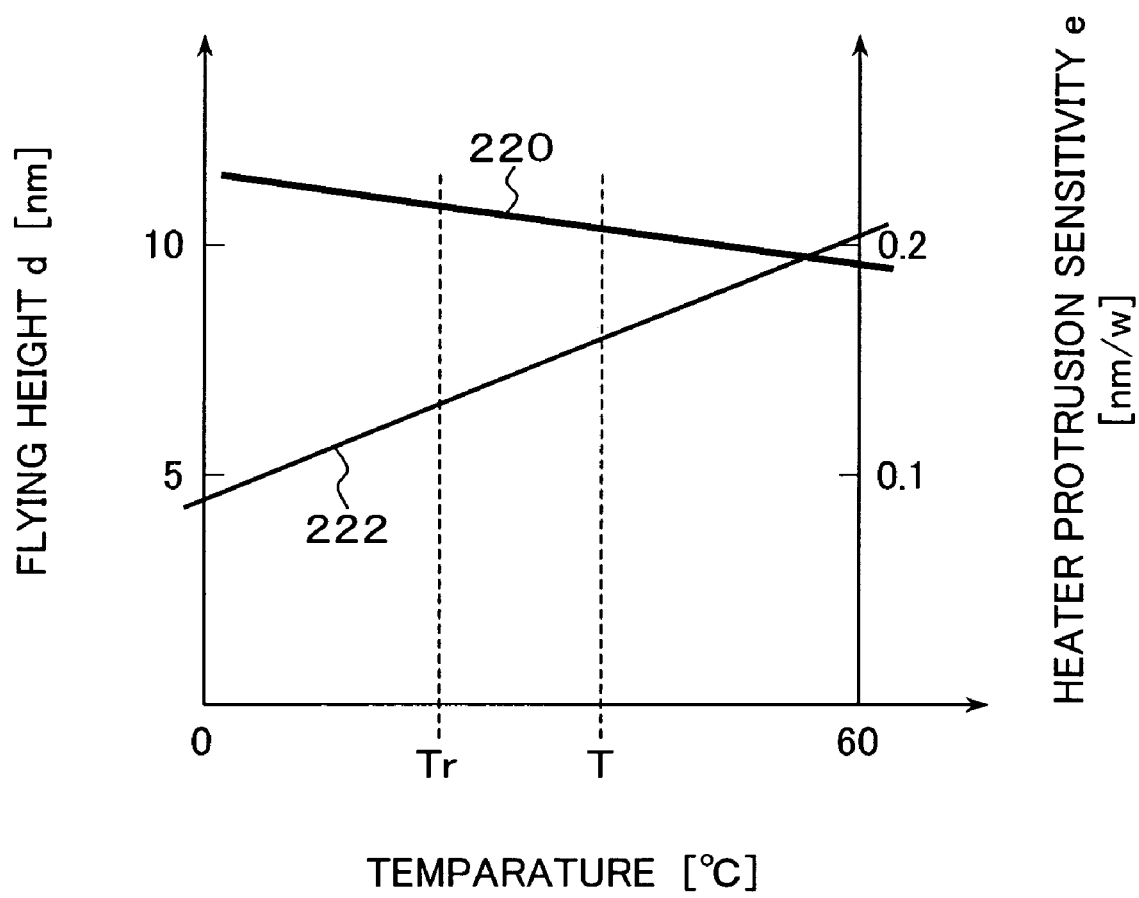
FIG. 24 is a graph diagram showing variation in the flying height and heater protrusion sensitivity with respect to the device temperature.

FIG. 24 is a graph diagram showing variation of the flying height and the heater protrusion sensitivity with respect to the apparatus environmental temperature. In FIG. 24, a range of 0° C. to 60° C. is set as a temperature usage range, and the variation of the flying height d when the heater electric power distribution amount is constant with respect to the temperature variation in this range is in the relation that the flying height do is reduced relative to increase in the temperature as shown by a flying height temperature characteristic 220; and, therefore, a positive flying height temperature correction coefficient Kd is calculated as the temperature correction coefficient. On the other hand, the heater protrusion sensitivity e is in the relation that it is increased in proportion to the temperature increase as shown by a heater protrusion sensitivity temperature characteristic 222. Therefore, a negative temperature coefficient is calculated as the temperature correction coefficient Ke. When the flying height temperature correction coefficient Kd and the heater protrusion sensitivity temperature correction coefficient Ke are calculated in this manner and retained, control for maintaining an accurate flying height can be realized with respect to the flying height obtained at the reference temperature and the heater protrusion sensitivity by using the control parameters undergone temperature correction to the values at the environmental temperature at which the magnetic disk apparatus is actually used. Also, the recording current protrusion value dw required in recording can be subjected to temperature correction by using the flying height temperature correction coefficient Kd for performing the temperature correction of the flying height do. When the reference temperature is Tr and the current apparatus temperature is T in FIG. 23, temperature correction is performed with the flying height do, the recording current protrusion value dw and the heater protrusion sensitivity e which are $$do = do' + Kd \cdot \Delta T$$

$$dw = dw' + Kd \cdot \Delta T$$

$$e = e' + Ke \cdot \Delta T.$$

Figure 25:
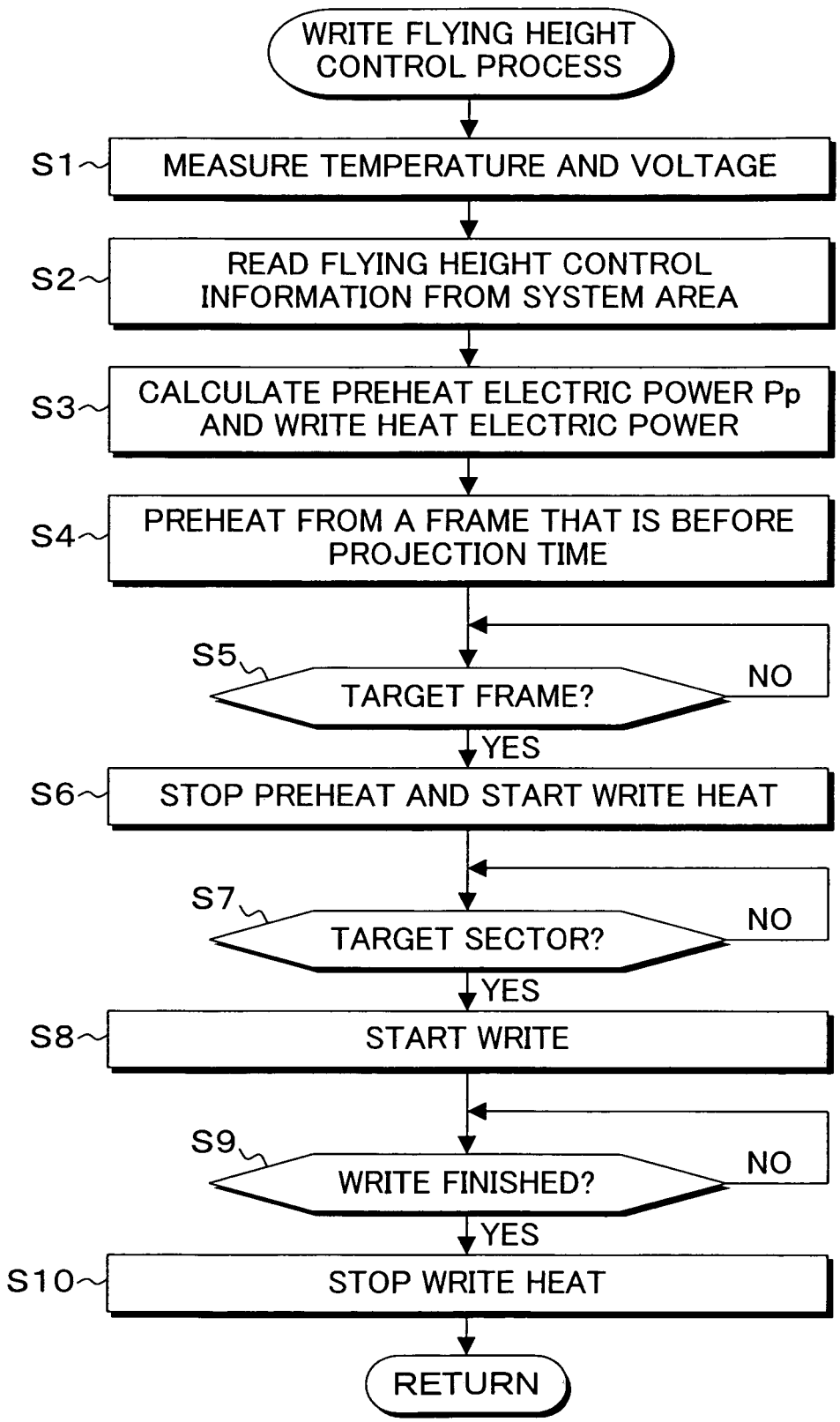
FIG. 25 is a flow chart of the write flying height control process of step s6 of FIG. 6.

FIG. 25 is a flow chart of the write flying height control process in step S6 of FIG. 6. The write flying height control process is executed in the state in which the head has undergone seek control and is positioned to the target track based on the write command in step S5 of FIG. 6. In the first place, the temperature and the voltage are measured in step S1, and the flying height control information is read from the system area in step S2. In practice, the flying height control information is read from the flying height control information table 50 deployed in the memory 30 as shown in FIGS. 1A and 1B. Next, preheat electric power Pp and write heat electric power Pw are calculated in step S3. In the write flying height control of the present embodiment, the expansion and protrusion caused by heater electric power distribution has to be completed such that a write target flying height is attained when the head reaches a target frame of a target track, i.e., a target frame in which a target sector is present. Therefore, with respect to the target frame, preheating is started the heater protrusion transition time tp, that is, from a frame position which is before by the number of frames converted from the heater protrusion transition time tp. The preheating is performed without the recording current which flows through the recording element; thus, the heater electric power p which is required for obtaining the write target flying height is calculated. Such preheating by the preheat electric power Pp is performed until the target frame; and, when it reaches the target frame, the preheat electric power Pp is turned off, and it is switched to the write heat electric power Pw. The write heat electric power Pw can be provided by the following expression which further includes the recording current protrusion value dw.

$$Pw = (do - dp - dw)/e$$

When the preheat electric power Pp and the write heat electric power Pw are calculated in this manner in step S3, preheating is started from step S4 by distributing the preheat electric power Pp to the heater from a frame before the heater protrusion transition time for the track obtained from the system area. In this preheating state, reach to the target frame is checked in step S5; and, if it has reached the target frame, the preheating is stopped in step S6, and write heating in which the write heat electric power Pw is distributed to the heater is started. When reach to the target sector is determined in step S7 in this write heating state, write is started in step S8; and, when write termination is determined in step S9, the write heating is stopped in step S10. The head protrusion value is controlled to a predetermined write target flying height by preheating and write heating at the point when the target frame reaches the head, and data write to the magnetic disk can be performed by an optimal flying height between the head and the magnetic disk.

Figure 26:
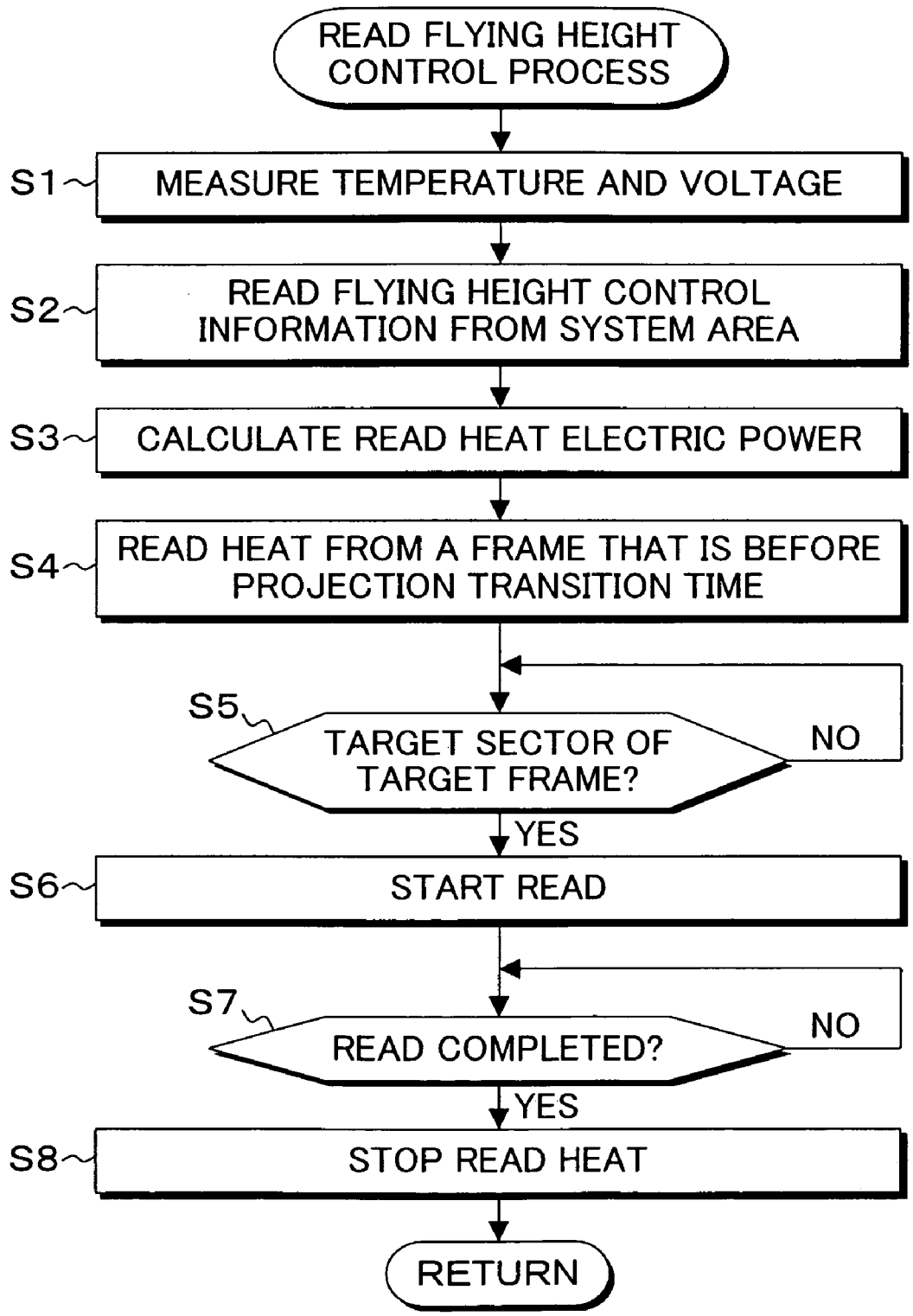
FIG. 26 is a flow chart of the read flying height control process of step S10 of FIG. 6.

FIG. 26 is a flow chart of the read flying height control process of step S10 of FIG. 6. The read flying height control process is executed in the state in which the head is positioned to a target track through decoding of the read command; and, after the temperature and the voltage are measured in step S1, control parameters as shown in the flying height control information table 50 of FIG. 5 corresponding to the zone which includes the target track are acquired from the system area in step S2, and then, read heat electric power Pr is calculated by the following expression in step S3.

$$Pr = (do - dp)/e$$

Next, in step S4, read heat is started by supplying the read heat electric power Pr calculated in step S3 to the heater from a frame before the heater protrusion transition time tp. When it reaches the target frame in this read heating state, the head protrusion caused by heater electric power distribution is completed, and the flying height is controlled to the read target flying height. When reach to the target sector of the target frame is determined in step S5 in this state, reading is started in step S6. Subsequently, when read completion is determined in step S7, the read heating is stopped at the timing of a next frame in step S8. The second embodiment shown in the flow chart of FIGS. 13A and 13B employs the examples in which w in the expression (4) for determining the number of measurement points to be grouped is w=2 or w=3; and the case in which w=1 is equivalent to the expression (3) in which the changed amount of the mean amplitudes with respect to the variation in the unit heater electric power distribution amounts at two measurement points are calculated. Therefore, when w=1 in the second embodiment, it is equivalent to the first embodiment.

In FIG. 21 showing measurement result of the third embodiment, although the standard deviation σ is shown as the contact determination value, the variance σ2 which is the square of the standard deviation σ may be used. When the variance σ2 is used, the variation rate with respect to the heater electric power distribution amount can be largely captured. In the above described embodiments, as shown in FIGS. 9A and 9B, amplitude measurement is performed by reading the read signals of the preamble areas in the servo frames of the magnetic disk 20; however, without using the servo frames, repetitive signals corresponding to the preamble areas may be written to the data frames, and amplitude measurement may be performed by reading that. Furthermore, the present invention provides the programs for the flying height measurement processes executed by the MPU 26 provided in the magnetic disk apparatus 10 of FIGS. 1A and 1B, and these programs have the processing contents shown in FIG. 10A, FIG. 10B, FIG. 13A, FIG. 13B, FIG. 20A, and FIG. 20B. Moreover, the present invention provides a storage medium storing the programs of the flying height measurement processes. Examples of the storage medium includes a portable-type storage medium such as a CD-ROM, a floppy disk (R), a DVD disk, a magneto-optical disk, or an IC card; a storage apparatus such as a hard disk drive provided inside/outside a computer system; a database or another computer system with a database thereof which retains the programs via a line; and an on-line transmission medium. Moreover, the above described embodiments employs an example of the case in which three types of measurement processes according to the first embodiment of FIGS. 10A and 10B, the second embodiment of FIGS. 13A and 13B, and the third embodiment of FIGS. 20A and 20B are provided as the flying height measurement unit 78 of the MPU 26 of FIG. 8; however, any one of the measurement processes may be provided. Moreover, when the plurality of measurement processes are provided, a unique flying height can be obtained by each of the measurement processes; therefore, a particular one flying height among the plurality of measured flying heights or a mean value of the plurality of measured flying heights may be stored in the table as a flying height. Note that the present invention includes arbitrary modifications that do not impair the object and advantages thereof, and is not limited by the numerical values shown in the above described embodiments.

What is claimed is:

1. A storage apparatus comprising
a head which has at least a reading element, is provided with a heater which varies a protrusion value by thermal expansion which accompanies electric power distribution and heating, and accesses data by flying above a rotating recording medium;
an amplitude measurement unit which measures an amplitude of a read signal from a preamble unit in a servo area of a predetermined frame number m per one rotation of the recording medium by the reading element for a predetermined cycle number n while increasing an electric power amount distributed to the heater in the state in which the head is positioned to a track on the recording medium;
a mean amplitude calculating unit which calculates a mean amplitude at each of the heater electric power amount from an amplitude measurement value which is measured by the amplitude measurement unit and corresponding to a number which is the predetermined frame number m multiplied by the predetermined cycle number n;
a contact determination unit which calculates a contact determination value based on a variation amount in the heater electric power amount and a variation amount in the mean amplitude, and determines that the head is in contact with the recording medium when the contact determination value is lower than a predetermined threshold value; and
a flying height calculating unit which calculates a flying height of the head with respect to a surface of the recording medium from the heater electric power amount at the point when contact is determined by the contact determination unit and outputs the flying height; and
wherein
when the mean amplitude of a current time is $\mu(i)$, the mean amplitude of a previous time when the heater electric power is $P(i-1)$ is $\mu(i-1)$, the heater electric power of the current time is $P(i)$, and the heater electric power of the previous time is $P(i-1)$,
the contact determination unit calculates the contact determination value as a contact determination value $S1(i)$ which is a ratio of a variation amount $\Delta\mu(i)$ of the mean amplitudes with respect to a variation amount $\Delta P(i)$ of the heater electric power amounts of the previous time and the current time.

2. The storage apparatus according to claim 1, wherein,
when the mean amplitude of a current time is $\mu(i)$, the mean amplitude of a previous time is $\mu(i-1)$, the heater electric power of the current time is $P(i)$, and the heater electric power of the previous time is $P(i-1)$, the contact determination unit calculates a variation ratio $S1(i)$ as the contact determination value by $$S1(i) = \frac{\mu(i) - \mu(i-1)}{P(i) - P(i-1)}.$$

3. A storage apparatus comprising
a head which has at least a reading element, is provided with a heater which varies a protrusion value by thermal expansion which accompanies electric power distribution and heating, and accesses data by flying above a rotating recording medium;
an amplitude measurement unit which measures an amplitude of a read signal from a preamble unit in a servo area of a predetermined frame number m per one rotation of the recording medium by the reading element for a predetermined cycle number n while increasing an electric power amount distributed to the heater in the state in which the head is positioned to a track on the recording medium;
a mean amplitude calculating unit which calculates a mean amplitude at each of the heater electric power amount from an amplitude measurement value which is measured by the amplitude measurement unit and corresponding to a number which is the predetermined frame number m multiplied by the predetermined cycle number n;
a contact determination unit which calculates a contact determination value based on a variation amount in the heater electric power amount and a variation amount in the mean amplitude, and determines that the head is in contact with the recording medium when the contact determination value is lower than a predetermined threshold value; and
a flying height calculating unit which calculates a flying height of the head with respect to a surface of the recording medium from the heater electric power amount at the point when contact is determined by the contact determination unit and outputs the flying height; and
wherein
when measurement time points are in a time sequence of a present time point i, a future measurement time point i+a, and a past measurement time point i−α(wherein, a is an integer of 1, 2, 3 . . . ), the contact determination unit obtains a first mean which is a mean amplitude of future w measurement time points from α=0 to α=w−1 including the present time point i and a second mean which is a mean amplitude of measurement time points of past w points from α=1 to α=w, and further calculates a variation ratio $S2(i)$ of the first mean and the second mean as the contact determination value.

4. The storage apparatus according to claim 3 wherein, when measurement time points are in a time sequence of a present time point i, a future measurement time point i+α, and a past measurement time point i−a (wherein, α is an integer of 1, 2, 3 . . . ), the contact determination unit calculates a variation ratio $S2(i)$ as the contact determination value as $$S2(i) = \frac{(1/w)\sum_{\alpha=0}^{w-1}\mu(i+\alpha) - (1/w)\sum_{\alpha=1}^{w}\mu(i-\alpha)}{w}$$

based on a mean amplitude of future w measurement time points including the present time point i and a mean amplitude of past w measurement time points.

5. The storage apparatus according to claim 3 or 4, wherein the number of w is 2 or 3.

6. The storage apparatus according to claim 1 or 3, wherein the predetermined frame number m of the amplitude measurement unit is a frame number which is ½ or less the disk medium, and the predetermined cycle number n is 10 to 100.

7. The storage apparatus according to claim 1 or 3, wherein the predetermined frame number m of the amplitude measurement unit is caused to be large in an inner circumferential side of the disk medium and is caused to be small in an outer circumferential side of the disk medium.

8. A storage apparatus comprising
a head which has at least a reading element, is provided with a heater which varies a protrusion value by thermal expansion which accompanies electric power distribution and heating, and accesses data by flying above a rotating recording medium;
an amplitude measurement unit which measures an amplitude of a read signal from a preamble unit in a servo area of a predetermined frame number m per one rotation of the recording medium by the reading element for a predetermined cycle number n while increasing an electric power amount distributed to the heater in the state in which the head is positioned to a track on the recording medium;
a variance calculating unit which calculates a variance for each heater electric power amount from a plurality of amplitude measurement values measured by the amplitude measurement unit;
a contact determination unit which determines that the head is in contact with the recording medium when the variance exceeds a threshold value; and
a flying height calculating unit which calculates a flying height of the head with respect to a surface of the recording medium from the heater electric power amount at the point when contact is determined by the contact determination unit and outputs the flying height; and
wherein
when a mean amplitude of each cycle measured at the heater electric power amount $P(i)$ is $V(i-1)$, and a mean amplitude of n cycles is $\mu(i)$, the variance calculating unit calculates the variance $s^2$ as $$\sigma^2 = \frac{\sum_{j=1}^{n} \{V(i, j) - \mu(i)\}^2}{n}.$$

9. The storage apparatus described in claim 8, wherein the predetermined frame number m of the amplitude measurement unit is 1 or 2, and the predetermined cycle number n is 10 to 100.

10. The storage apparatus according to claim 8 wherein the variance calculating unit calculates a standard deviation as a square root of the variance, and the contact determination unit determines that the head is in contact with the recording medium when the standard deviation exceeds a predetermined threshold value.

11. A control method of a storage apparatus having a head which has at least a reading element, is provided with a heater which varies a protrusion value by thermal expansion which accompanies electric power distribution and heating, and accesses data by flying above a rotating recording medium; the control method comprising
an amplitude measurement step in which an amplitude of a read signal is measured from a preamble unit in a servo area of a predetermined frame number m per one rotation of the recording medium by the reading element for a predetermined cycle number n while increasing an electric power amount distributed to the heater in the state in which the head is positioned to a track on the recording medium;
a mean amplitude calculating step in which a mean amplitude is calculated for each of the heater electric power amount from an amplitude measurement value which is measured in the amplitude measurement step and corresponding to a number which is the predetermined frame number m multiplied by the predetermined cycle number n;
a contact determination step in which a contact determination value is calculated based on a variation amount in the heater electric power amount and a variation amount in the mean amplitude, and it is determined that the head is in contact with the recording medium when the contact determination value is lower than a predetermined threshold value; and
a flying height calculating step in which a flying height of the head with respect to a surface of the recording medium is calculated from the heater electric power amount at the point when contact is determined in the contact determination step and outputs the flying height; and wherein
when the mean amplitude of a current time is $\mu(i)$, the mean amplitude of a previous time is $\mu(i-1)$, the heater electric power of the current time is $P(i)$, and the heater electric power of the previous time is $P(i-1)$, in the contact determination step, a variation ratio $S1(i)$ is calculated as the contact determination value by $$S1(i) = \frac{\mu(i) - \mu(i-1)}{P(i) - P(i-1)}.$$

12. A control method of a storage apparatus, having a head which has at least a reading element, the storage apparatus being provided with a heater which varies a protrusion value by thermal expansion which accompanies electric power distribution and heating, and accesses data by flying above a rotating recording medium, the control method comprising
an amplitude measurement step in which an amplitude of a read signal is measured from a preamble unit in a servo area of a predetermined frame number m per one rotation of the recording medium by the reading element for a predetermined cycle number n while increasing an electric power amount distributed to the heater in the state in which the head is positioned to a track on the recording medium;
a mean amplitude calculating step in which a mean amplitude is calculated for each of the heater electric power amount from an amplitude measurement value which is measured in the amplitude measurement step and corresponding to a number which is the predetermined frame number m multiplied by the predetermined cycle number n;
a contact determination step in which a contact determination value is calculated based on a variation amount in the heater electric power amount and a variation amount in the mean amplitude, and it is determined that the head is in contact with the recording medium when the contact determination value is lower than a predetermined threshold value; and
a flying height calculating step in which a flying height of the head with respect to a surface of the recording medium is calculated from the heater electric power amount at the point when contact is determined in the contact determination step and output the flying height; and wherein
when measurement time points are in a time sequence of a present time point i, a future measurement time point i+α, and a past measurement time point i−α(wherein, α is an integer of 1, 2, 3 . . . ) in the contact determination step, a variation ratio S2(i) is calculated as the contact determination value as $$S2(i) = \frac{(1/w)\sum_{\alpha=0}^{w-1}\mu(i+\alpha) - (1/w)\sum_{\alpha=1}^{w}\mu(i-\alpha)}{w}$$

based on a mean amplitude of future w measurement time points including the present time point i and a mean amplitude of past w measurement time points.

13. A control method of a storage apparatus having a head which has at least one reading element, is provided with a heater which varies a protrusion value by thermal expansion which accompanies electric power distribution and heating, and accesses data by flying above a rotating recording medium; the control method comprising an amplitude measurement step in which an amplitude of a read signal is measured from a preamble step in a servo area of a predetermined frame number m per one rotation of the recording medium by the reading element for a predetermined cycle number n while increasing an electric power amount distributed to the heater in the state in which the head is positioned to a track on the recording medium;

a variance calculating step in which a variance for each heater electric power amount is calculated from a plurality of amplitude measurement values measured in the amplitude measurement step;

a contact determination step in which it is determined that the head is in contact with the recording medium when the variance or a standard deviation exceeds a threshold value; and a flying height calculating step in which a flying height of the head with respect to a surface of the recording medium is calculated from the heater electric power amount at the point when contact is determined in the contact determination step and outputs the flying height; and wherein when a mean amplitude of each cycle measured at the heater electric power amount P(i) is V(i−1), and a mean amplitude of n cycles is µ(i), in the variance calculating step, the variance s² is calculated as $$\sigma^2 = \frac{\sum_{j=1}^{n}\{V(i,j) - \mu(i)\}^2}{n}$$

or calculates the standard deviation s as a square root of the variance.

14. A control device of a storage apparatus having a head which has at least a reading element, is the storage apparatus being provided with a heater which varies a protrusion value by thermal expansion which accompanies electric power distribution and heating, and accesses data by flying above a rotating recording medium; the control device comprising an amplitude measurement unit which measures an amplitude of a read signal from a preamble unit in a servo area of a predetermined frame number m per one rotation of the recording medium by the reading element for a predetermined cycle number n while increasing an electric power amount distributed to the heater in the state in which the head is positioned to a track on the recording medium;

a mean amplitude calculating unit which calculates a mean amplitude for each of the heater electric power amount from an amplitude measurement value which is measured by the amplitude measurement unit and measured by a number which is the predetermined frame number m multiplied by the predetermined cycle number n;

a contact determination unit which calculates a contact determination value based on a variation amount in the heater electric power amount and a variation amount in the mean amplitude, and determines that the head is in contact with the recording medium when the contact determination value is lower than a predetermined threshold value; and a flying height calculating unit which calculates a flying height of the head with respect to a surface of the recording medium from the heater electric power amount at the point when contact is determined in the contact determination step and outputs the flying height; and wherein when the mean amplitude of a current time is µ(i), the mean amplitude of a previous time when the heater electric power is P(i−1) is µ(i−1), the heater electric power of the current time is P(i), and the heater electric power of the previous time is P(i−1), the contact determination unit calculates the contact determination value as a contact determination value S1(i) which is a ratio of a variation amount ∆µ(i−1) of the mean amplitudes with respect to a variation amount ∆P(i) of the heater electric power amounts of the previous time and the current time.

15. A control device of a storage apparatus having a head which has at least a reading element, is the storage apparatus being provided with a heater which varies a protrusion value by thermal expansion which accompanies electric power distribution and heating, and accesses data by flying above a rotating recording medium; the control device comprising an amplitude measurement unit which measures an amplitude of a read signal from a preamble unit in a servo area of a predetermined frame number m per one rotation of the recording medium by the reading element for a predetermined cycle number n while increasing an electric power amount distributed to the heater in the state in which the head is positioned to a track on the recording medium;

a variance calculating unit which calculates a variance or a standard deviation for each heater electric power amount from a plurality of amplitude measurement values measured by the amplitude measurement unit;

a contact determination unit which determines that the head is in contact with the recording medium when the variance or the standard deviation exceeds a threshold value; and a flying height calculating unit which calculates a flying height of the head with respect to a surface of the recording medium from the heater electric power amount at the point when contact is determined by the contact determination unit and outputs the flying height; and wherein when a mean amplitude of each cycle measured at the heater electric power amount P(i) is V(i−j), and a mean amplitude of n cycles is µ(i), in the variance calculating unit calculates the variance s² as $$\sigma^2 = \frac{\sum_{j=1}^{n}\{V(i,j)-\mu(i)\}^2}{n}$$

or calculates the standard deviation s as a square root of the variance.

16. A computer-readable storage medium which stores a program characterized by causing a computer of a storage apparatus having a head which has at least a reading element, is the storage apparatus being provided with a heater which varies a protrusion value by thermal expansion which accompanies electric power distribution and heating, and accesses data by flying above a rotating recording medium, to execute an amplitude measurement step in which an amplitude of a read signal is measured from a preamble unit in a servo area of a predetermined frame number m per one rotation of the recording medium by the reading element for a predetermined cycle number n while increasing an electric power amount distributed to the heater in the state in which the head is positioned to a track on the recording medium;

a mean amplitude calculating step in which a mean amplitude is calculated for each of the heater electric power amount from an amplitude measurement value which is measured in the amplitude measurement step and measured by a number which is the predetermined frame number m multiplied by the predetermined cycle number n;

a contact determination step in which a contact determination value is calculated based on a variation amount in the heater electric power amount and a variation amount in the mean amplitude, and it is determined that the head is in contact with the recording medium when the contact determination value is lower than a predetermined threshold value; and a flying height calculating step in which a flying height of the head with respect to a surface of the recording medium is calculated from the heater electric power amount at the point when contact is determined in the contact determination step and outputs the flying height; and wherein when the mean amplitude of a current time is $\mu(i)$, the mean amplitude of a previous time when the heater electric power is $P(i-1)$ is $\mu(i-1)$, the heater electric power of the current time is $P(i)$, and the heater electric power of the previous time is $P(i-1)$, the contact determination unit calculates the contact determination value as a contact determination value $S1(i)$ which is a ration of a variation amount $\Delta\mu(i)$ of the mean amplitudes with respect to a variation amount $\Delta P(i)$ of the heater electric power amounts of the previous time and the current time.

17. A computer-readable storage medium which stores a program that causes a computer of a storage apparatus having a head which has at least a reading element, the storage apparatus being provided with a heater which varies a protrusion value by thermal expansion which accompanies electric power distribution and heating, and accesses data by flying above a rotating recording medium, to execute an amplitude measurement step in which an amplitude of a read signal is measured from a preamble step in a servo area of a predetermined frame number m per one rotation of the recording medium by the reading element for a predetermined cycle number n while increasing an electric power amount distributed to the heater in the state in which the head is positioned to a track on the recording medium;

a variance calculating step in which a variance or a standard deviation for each heater electric power amount is calculated from a plurality of amplitude measurement values measured in the amplitude measurement step;

a contact determination step in which it is determined that the head is in contact with the recording medium when the variance or the standard deviation exceeds a threshold value; and a flying height calculating step in which a flying height of the head with respect to a surface of the recording medium is calculated from the heater electric power amount at the point when contact is determined in the contact determination step and outputs the flying height; and wherein when a mean amplitude of each cycle measured at the heater electric power amount $P(i)$ is $V(i-1)$, and a mean amplitude of n cycles is $\mu(i)$, in the variance calculating step, the variance $s^2$ is calculated as $$\sigma^2 = \frac{\sum_{j=1}^{n}\{V(i,j)-\mu(i)\}^2}{n}$$

or calculates the standard deviation s as a square root of the variance.

* * * * *

UNITED STATES PATENT AND TRADEMARK OFFICE
CERTIFICATE OF CORRECTION

PATENT NO. : 7,468,854 B2  Page 1 of 1
APPLICATION NO. : 11/645189
DATED : December 23, 2008
INVENTOR(S) : Satoshi Yamashita It is certified that error appears in the above-identified patent and that said Letters Patent is hereby corrected as shown below:

Col. 32, line 65, delete "V(i-j)" and insert --V(i, j)--.

Signed and Sealed this

Fifth Day of May, 2009

JOHN DOLL
*Acting Director of the United States Patent and Trademark Office*